US011935482B2

(12) United States Patent
Sang et al.

(10) Patent No.: US 11,935,482 B2
(45) Date of Patent: Mar. 19, 2024

(54) PIXEL CIRCUIT AND DISPLAY DEVICE INCLUDING THE SAME

(71) Applicant: LG DISPLAY CO., LTD., Seoul (KR)

(72) Inventors: Woo Kyu Sang, Paju-si (KR); Moon Soo Chung, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 17/954,272

(22) Filed: Sep. 27, 2022

(65) Prior Publication Data

US 2023/0097941 A1 Mar. 30, 2023

(30) Foreign Application Priority Data

Sep. 30, 2021 (KR) ........................ 10-2021-0130007

(51) Int. Cl.
*G09G 3/3258* (2016.01)
*G09G 3/3266* (2016.01)
(Continued)

(52) U.S. Cl.
CPC ......... *G09G 3/3258* (2013.01); *G09G 3/3266* (2013.01); *G09G 3/3291* (2013.01);
(Continued)

(58) Field of Classification Search
CPC .. G09G 3/3258; G09G 3/3266; G09G 3/3275; G09G 3/3291; G09G 2300/0426;
(Continued)

(56) References Cited

U.S. PATENT DOCUMENTS

2009/0109150 A1* 4/2009 Han ..................... G09G 3/3266 345/82
2009/0251496 A1 10/2009 Saito et al.
(Continued)

FOREIGN PATENT DOCUMENTS

CN 111312161 A 6/2020
EP 3 147 894 A1 3/2017
(Continued)

OTHER PUBLICATIONS

Extended European Search Report dated Dec. 22, 2022, issued in corresponding European Patent Application No. 22192833.6.
(Continued)

*Primary Examiner* — Nitin Patel
*Assistant Examiner* — Saifeldin E Elnafia
(74) *Attorney, Agent, or Firm* — Morgan, Lewis & Bockius LLP

(57) ABSTRACT

A pixel circuit includes a first switch element turned on by a gate-on voltage of a first scan pulse to apply a data voltage to a first node; a second switch element turned on by a gate-on voltage of a second scan pulse to connect a second node to a third node; a third switch element turned on by a gate-on voltage of a light-emitting control pulse to apply a reference voltage to the first node; a fourth switch element turned on by the gate-on voltage of the light-emitting control pulse to connect the third node to a fourth node; and a fifth switch element turned on by a gate-on voltage of the second scan pulse to apply the reference voltage to the fourth node. A voltage higher than or equal to the pixel driving voltage is applied to the third node before generation of the first scan pulse.

10 Claims, 36 Drawing Sheets

(51) Int. Cl.
*G09G 3/3291* (2016.01)
*G09G 3/3275* (2016.01)

(52) U.S. Cl.
CPC ... *G09G 3/3275* (2013.01); *G09G 2300/0426* (2013.01); *G09G 2300/0842* (2013.01); *G09G 2310/0264* (2013.01); *G09G 2310/027* (2013.01); *G09G 2310/0278* (2013.01); *G09G 2310/08* (2013.01); *G09G 2330/021* (2013.01)

(58) Field of Classification Search
CPC ..... G09G 2300/0842; G09G 2310/027; G09G 2310/0278; G09G 2310/0264; G09G 2310/08; G09G 2330/021
See application file for complete search history.

(56) References Cited

U.S. PATENT DOCUMENTS

| | | | | |
|---|---|---|---|---|
| 2013/0092930 | A1 | 4/2013 | Kimura | |
| 2013/0222440 | A1 | 8/2013 | Ikeda | |
| 2017/0132980 | A1 | 5/2017 | Wu et al. | |
| 2018/0275795 | A1 | 9/2018 | Takahashi | |
| 2019/0096336 | A1* | 3/2019 | Lee | G09G 3/3291 |
| 2019/0295476 | A1* | 9/2019 | Ji | G09G 3/3233 |
| 2020/0342813 | A1* | 10/2020 | Gao | G09G 3/3291 |
| 2022/0051611 | A1 | 2/2022 | Yin | |

FOREIGN PATENT DOCUMENTS

| | | | |
|---|---|---|---|
| EP | 3 462 437 | A1 | 4/2019 |
| JP | 2008-134625 | A | 6/2008 |
| JP | 2009-237068 | A | 10/2009 |
| JP | 2010-175586 | A | 8/2010 |
| JP | 2013-137509 | A | 7/2013 |
| JP | 2013-178311 | A | 9/2013 |
| JP | 2017-90624 | A | 5/2017 |
| JP | 2018-159885 | A | 10/2018 |
| KR | 10-0889675 | B1 | 3/2009 |
| KR | 10-2018-0115205 | A | 10/2018 |
| KR | 10-2020-0030415 | A | 3/2020 |
| KR | 10-2021-0001047 | A | 1/2021 |

OTHER PUBLICATIONS

Office Action dated Jul. 4, 2023 for the corresponding Japanese Patent Application 2022-134570 (See English Translation).
Office Action dated Jul. 18, 2023 for the corresponding Taiwanese Patent Application 111133379 (See English Translation).
Office Action dated Jan. 23, 2024 for corresponding Korean Patent Application No. 10-2021-0130007.

* cited by examiner

PIXEL CIRCUIT AND DISPLAY DEVICE INCLUDING THE SAME

CROSS-REFERENCE TO RELATED APPLICATION

This application claims priority to and the benefit of Korean Patent Application No. 10-2021-0130007, filed on Sep. 30, 2021, the disclosure of which is incorporated herein by reference in its entirety.

BACKGROUND

1. Technical Field

The present disclosure relates to a pixel circuit and a display device including the same.

2. Discussion of the Related Art

An electroluminescence display device may include an inorganic light emitting display device and an organic light emitting display device according to the material of the emission layer. The active matrix type organic light emitting display device includes an organic light emitting diode (hereinafter, referred to as "OLED") that emits light by itself, and has the advantage of fast response speed, high light-emitting efficiency, high luminance and wide viewing angle. In the organic light emitting display device, the OLED (Organic Light Emitting Diode) is formed in each pixel. The organic light emitting display device has a fast response speed, excellent light-emitting efficiency, luminance, and viewing angle, and has also excellent contrast ratio and color reproducibility because black gray scale can be expressed as complete black.

A pixel circuit of a field emission display device includes an organic light-emitting diode (OLED) used as a light-emitting element and a driving element for driving the OLED.

When a grayscale value of pixel data changes greatly, a response time may increase in a first frame period in which reproduction of an input image starts due to a time required to change hysteresis characteristics of a driving element. Accordingly, a first frame response (FFR) may worsen.

SUMMARY

Accordingly, embodiments of the present disclosure are directed to a pixel circuit and a display device including the same that substantially obviates one or more of the problems due to limitations and disadvantages of the related art.

An aspect of the present disclosure is to provide a pixel circuit having improved response characteristics of pixels and a display device including the same.

Additional features and aspects will be set forth in the description that follows, and in part will be apparent from the description, or may be learned by practice of the inventive concepts provided herein. Other features and aspects of the inventive concepts may be realized and attained by the structure particularly pointed out in the written description, or derivable therefrom, and the claims hereof as well as the appended drawings.

To achieve these and other aspects of the inventive concepts, as embodied and broadly described herein, a pixel circuit comprises a capacitor connected between a first node and a second node; a driving element including a gate electrode connected to the second node, a first electrode to which a pixel driving voltage is applied, and a second electrode connected to a third node; a light-emitting element including an anode electrode connected to a fourth node and a cathode electrode to which a low-potential power supply voltage is applied; a first switch element configured to be turned on by a gate-on voltage of a first scan pulse to apply a data voltage to the first node; a second switch element configured to be turned on by a gate-on voltage of a second scan pulse to connect the second node to the third node; a third switch element configured to be turned on by a gate-on voltage of a light-emitting control pulse to apply a reference voltage to the first node, the reference voltage being lower than the pixel driving voltage and the low-potential power supply voltage; a fourth switch element configured to be turned on by the gate-on voltage of the light-emitting control pulse to connect the third node to the fourth node; and a fifth switch element configured to be turned on by a gate-on voltage of the second scan pulse to apply the reference voltage to the fourth node.

A voltage higher than or equal to the pixel driving voltage is applied to the third node before generation of the first scan pulse.

In another aspect, a display device comprises a display panel in which a plurality of data lines, a plurality of gate lines, a plurality of power lines, and a plurality of pixels are disposed; a data driver configured to apply a data voltage to the plurality of data lines; and a gate driver configured to supply a gate signal to the plurality of gate lines.

The gate signal includes a first scan pulse, a second scan pulse, and a third scan pulse.

Each of the pixels includes the pixel circuit.

It is to be understood that both the foregoing general description and the following detailed description are exemplary and explanatory and are intended to provide further explanation of the inventive concepts as claimed.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain various principles. In the drawings:

FIG. 21 is a diagram illustrating a gate-source voltage when a driving element that is in an off state is turned on;

FIG. 22 is a diagram illustrating a change in an absolute value of a drain-source current during changing of a driving element from an equilibrium state to a non-equilibrium state and finally to the equilibrium state, when the driving element that is in an off state is turned on;

DETAILED DESCRIPTION

Figure 1:
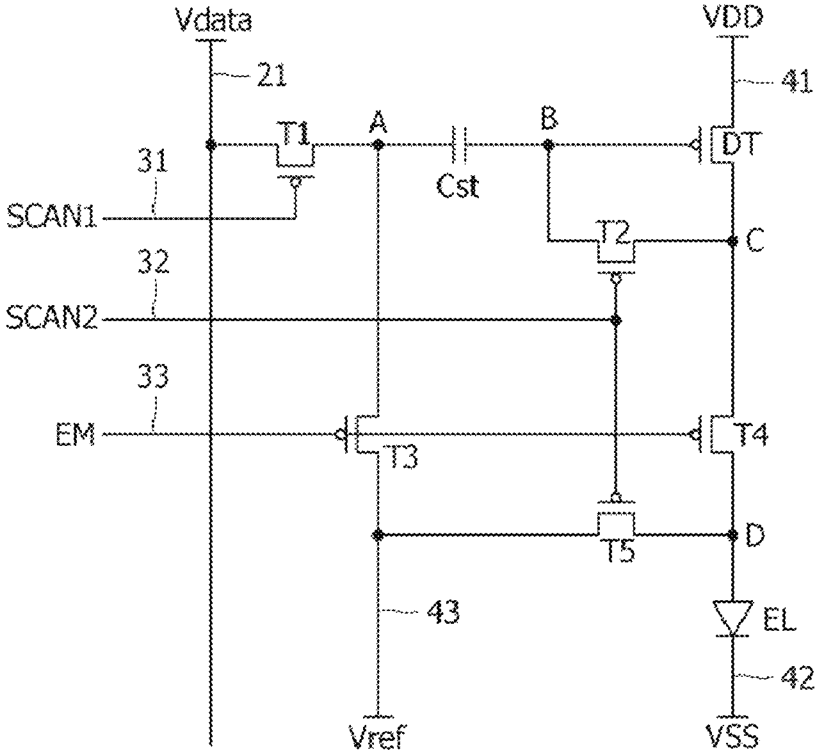
FIG. 1 is a circuit diagram of a pixel circuit according to a first embodiment of the present disclosure.

The advantages and features of the present disclosure and methods for accomplishing the same will be more clearly understood from embodiments described below with reference to the accompanying drawings. However, the present disclosure is not limited to the following embodiments but may be implemented in various different forms. Rather, the present embodiments will make the disclosure of the present disclosure complete and allow those skilled in the art to completely comprehend the scope of the present disclosure. The present disclosure is only defined within the scope of the accompanying claims.

The shapes, sizes, ratios, angles, numbers, and the like illustrated in the accompanying drawings for describing the embodiments of the present disclosure are merely examples, and the present disclosure is not limited thereto. Like reference numerals generally denote like elements throughout the present specification. Further, in describing the present disclosure, detailed descriptions of known related technologies may be omitted to avoid unnecessarily obscuring the subject matter of the present disclosure.

The terms such as "comprising," "including," "having," and "consist of" used herein are generally intended to allow other components to be added unless the terms are used with the term "only." Any references to singular may include plural unless expressly stated otherwise.

Components are interpreted to include an ordinary error range even if not expressly stated.

When the position relation between two components is described using the terms such as "on," "above," "below," and "next," one or more components may be positioned between the two components unless the terms are used with the term "immediately" or "directly."

The terms "first," "second," and the like may be used to distinguish components from each other, but the functions or structures of the components are not limited by ordinal numbers or component names in front of the components.

The following embodiments can be partially or entirely bonded to or combined with each other and can be linked and operated in technically various ways. The embodiments can be carried out independently of or in association with each other.

Each of the pixels may include a plurality of sub-pixels having different colors to in order to reproduce the color of the image on a screen of the display panel. Each of the sub-pixels includes a transistor used as a switch element or a driving element. Such a transistor may be implemented as a TFT (Thin Film Transistor).

A driving circuit of the display device writes a pixel data of an input image to pixels on the display panel. To this end, the driving circuit of the display device may include a data driving circuit configured to supply data signal to the data lines, a gate driving circuit configured to supply a gate signal to the gate lines, and the like.

In the display device of the present disclosure, the pixel circuit may include a plurality of transistors. The transistor may be implemented as a thin film transistor (TFT), and may be an oxide TFT including an oxide semiconductor or a low temperature poly silicon (LTPS) TFT including LTPS. In the present disclosure, a driving element of each pixel is implemented with an n-channel oxide TFT implemented as the oxide TFT. In the pixels, a switch element except for the driving element is not limited to the oxide TFT.

A transistor is a three-electrode element including a gate, a source, and a drain. The source is an electrode through which carriers are supplied to the transistor. In the transistor, carriers begin to flow from the source. The drain is an electrode through which carriers exit the transistor. In the transistor, carriers flow from the source to the drain. In the case of an n-channel transistor, since carriers are electrons, a source voltage is lower than a drain voltage so that electrons can flow from the source to the drain. In the n-channel transistor, a current flows from the drain to the source. In the case of a p-channel transistor, since carriers are holes, a source voltage is higher than a drain voltage so that holes can flow from the source to the drain. In the p-channel transistor, since holes flow from the source to the drain, a current flows from the source to the drain. It should be noted that the source and drain of the transistor are not fixed. For example, the source and the drain may be changed according to an applied voltage. Accordingly, the present disclosure is not limited by the source and drain of the transistor. In the following description, the source and drain of the transistor will be referred to as first and second electrodes.

A gate pulse may swing between a gate on voltage and a gate off voltage. The transistor is turned on in response to the gate-on voltage, and turned off in response to the gate-off voltage. In the case of the n-channel transistor, the gate-on voltage may be a gate high voltage VGH and VEH, and the gate-off voltage may be a gate low voltage VGL and VEL.

Hereinafter, various embodiments of the present disclosure will be described in detail with reference to the accompanying drawings. In the following embodiments, the display device will be mainly described as an organic light emitting display device, but the present disclosure is not limited thereto.

Referring to FIG. 1, a pixel circuit according to a first embodiment of the present disclosure includes a light-emitting element EL, a plurality of switch elements T1 to T5, a driving element DT, a capacitor Cst, and the like. The switch elements T1 to T5 and the driving element DT may be embodied together as a p-channel transistor but embodiments are not limited thereto.

A data voltage Vdata and gate signals SCAN1, SCAN2 and EM are supplied to the pixel circuit. The gate signals SCAN1, SCAN2, and EM include pulses that swing between gate-on voltages VGL and VEL and gate-off voltages VGH and VEH. In addition, a constant voltage (or direct-current (DC) voltage) such as a pixel driving voltage VDD, a low-potential power supply voltage VSS, and a reference voltage Vref are applied to the pixel circuit. The constant voltage applied to the pixel circuit are set in an order of VDD>Vref>VSS. The gate-off voltages VGH and VEH may be set to be higher than the pixel driving voltage VDD, and the gate-on voltages VGL and VEL may be set to be lower than the low-potential power supply voltage VSS. The data voltage Vdata is in a range higher than the low-potential voltage VSS and lower than the pixel driving voltage VDD. The reference voltage Vref may be set to a specific voltage that is in a data voltage range.

The light-emitting element EL may be embodied as an OLED. The OLED includes an organic compound layer between an anode electrode and a cathode electrode. The organic compound layer may include, but is not limited to, a hole injection layer (HIL), a hole transport layer (HTL), an emission layer (EML), an electron transport layer (ETL), and an electronic injection layer (EIL). The anode electrode of the light-emitting element (EL) is connected to a fourth node D. The cathode electrode of the OLED is connected to a VSS line 42 or a VSS electrode to which the low-potential power supply voltage VSS is applied.

The driving element DT supplies current generated according to a gate-source voltage Vgs to the light-emitting element EL, thereby driving the light-emitting element EL. The driving element DT includes a gate electrode connected to a second node B, a first electrode connected to a VDD line 41 to which the pixel driving voltage VDD is applied, and a second electrode connected to a third node C.

The capacitor Cst is connected between the first node A and the second node B. The first node A is connected to a second electrode of the first switch element T1, a first electrode of the third switch element T3, and a first electrode of the capacitor Cst. The second node B is connected to a second electrode of the capacitor Cst, a gate electrode of the driving element DT, and a first electrode of the second switch element T2. The capacitor Cst is charged with the data voltage Vdata compensated for by a sampled threshold voltage Vth of the driving element DT. Therefore, in each of subpixels, the data voltage Vdata is compensated for by the threshold voltage Vth of the driving element DT, and thus a deviation of characteristics of the driving element DT may be compensated for to drive the subpixels according to uniform driving characteristics.

The switch elements T1 to T5 are turned on by the gate-on voltages VGL and VEL applied to gate electrodes thereof and are turned off by the gate-off voltages VGH and VEH.

The first switch element T1 applies the data voltage Vdata to the first node A in response to a first scan pulse SCAN1. The first switch element T1 includes a gate electrode connected to a first gate line 31, a first electrode connected to a data line 21, and a second electrode connected to the first node A. The first scan pulse SCAN1 may be generated as a pulse of the gate-on voltage VGL. A pulse width of the first scan pulse SCAN1 may be set to about one horizontal period 1H.

The second switch element T2 connects the second node B and the third node C in response to the second scan pulse SCAN2, thereby operating the driving element DT as a diode. The second switch element T2 includes a gate electrode connected to a second gate line 32, a first electrode connected to the second node B, and a second electrode connected to the third node C. The second scan pulse SCAN2 is applied to the pixel circuit through the second gate line 32.

The third switch element T3 applies the reference voltage Vref to the first node A in response to an emission control pulse (hereinafter referred to as an "EM pulse"). The third switch element T3 includes a gate electrode connected to a third gate line 33, a first electrode connected to the first node A, and a second electrode connected to a Vref line 43. The EM pulse EM is generated as a pulse of the gate-off voltage VEH having a pulse width longer than one horizontal period. When a voltage of the third gate line 33 to which the EM pulse EM is applied is the gate-on voltage VEL, a current path may be formed between the pixel driving voltage VDD and the light-emitting element EL.

The fourth switch element T4 switches the current path of the light-emitting element EL in response to the EM pulse EM. The gate electrode of the fourth switch element T4 is connected to the third gate line 33. The first electrode of the fourth switch element T4 is connected to the third node C and the second electrode thereof is connected to the fourth node D.

The fifth switch element T5 applies the reference voltage Vref to the fourth node D in response to the second scan pulse SCAN2. The fifth switch element T5 includes a gate electrode connected to the second gate line 32, a first electrode connected to the Vref line 43, and a second electrode connected to the fourth node D.

In the pixel circuit of FIG. 1, before generation of the first scan pulse SCAN1, i.e., before sampling of the threshold voltage Vth of the driving element DT, a voltage higher than or equal to the pixel driving voltage VDD may be applied to the third node C, so that a source-drain channel may be formed in advance by the gate-source voltage Vgs to sample the threshold voltage Vth of the driving element DT without being influenced by a previous data voltage and to drive the driving element DT with the gate-source voltage.

A driving method of the pixel circuit will be described in detail with reference to FIGS. 2A to 5B. As shown in FIGS. 2A to 5B, the pixel circuit may be driven by performing a first step (or an initialization step) INI of initializing the pixel circuit, a second step (or a compensation step) OBS of forming the drain-source channel of the driving element DT before sampling the threshold voltage Vth of the driving element DT, a third step (or a sampling step) SAM of writing pixel data to the pixel circuit and sampling the threshold voltage Vth of the driving element DT, and a fourth step (or an step of driving the light-emitting element) EMI of driving the light-emitting element EL.

Figure 2A:
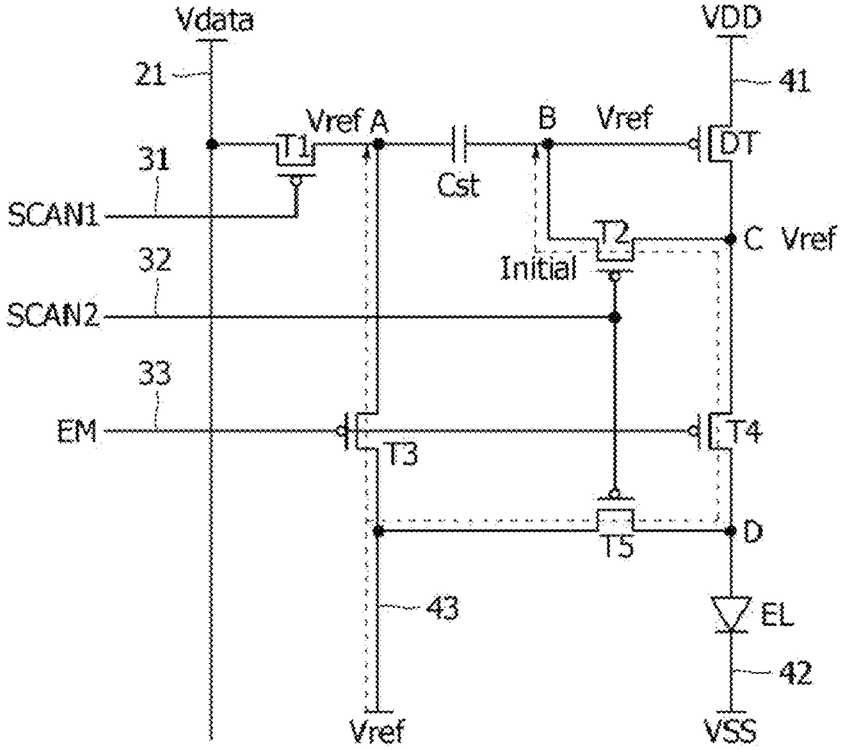
FIGS. 2A and 2B are diagrams illustrating a first step of a pixel circuit according to the first embodiment of the present disclosure.
Figure 2B:
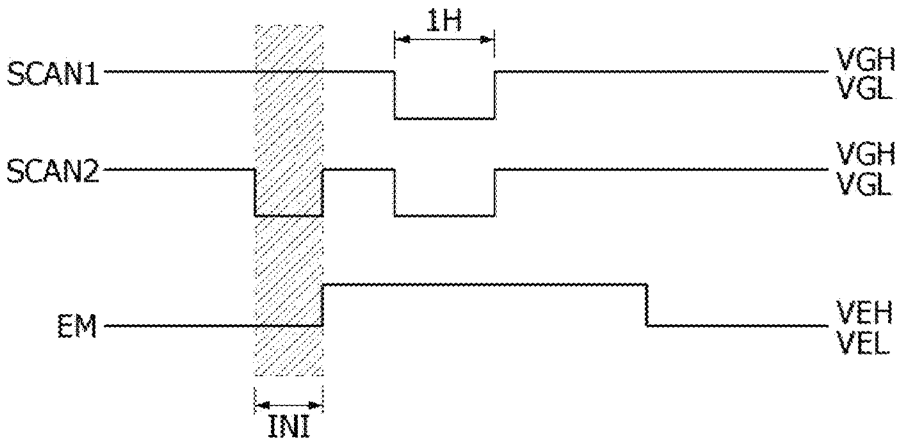

FIGS. 2A and 2B are diagrams illustrating the first step INI of the pixel circuit of FIG. 1. FIG. 2A is a circuit diagram illustrating a flow of current in the pixel circuit and voltages of major nodes in the first step INI. FIG. 2B is a waveform diagram of a gate signal supplied to the pixel circuit in the first step INI.

Referring to FIGS. 2A and 2B, a second scan pulse SCAN2 of a gate-on voltage VGL is applied to the second gate line 32 in the first step INI. In this case, a voltage of the first gate line 31 is a gate-off voltage VGH, and a voltage of the third gate line 33 is a gate-on voltage VEL. Thus, in the first step INI, the second to fifth switch elements T2 to T5 are turned on to initialize the major nodes A to D and the capacitor Cst.

In the first step INI, the first to fourth nodes A to D are initialized to a reference voltage Vref. In the first step INI, the driving element DT is turned on and the light-emitting element EL is turned off. In the first step INI, the difference between the reference voltage Vref applied to the anode electrode of the light-emitting element EL and a low-potential power supply voltage VSS applied to the cathode electrode thereof is lower than the threshold voltage Vth of the light-emitting element EL.

Figure 3A:
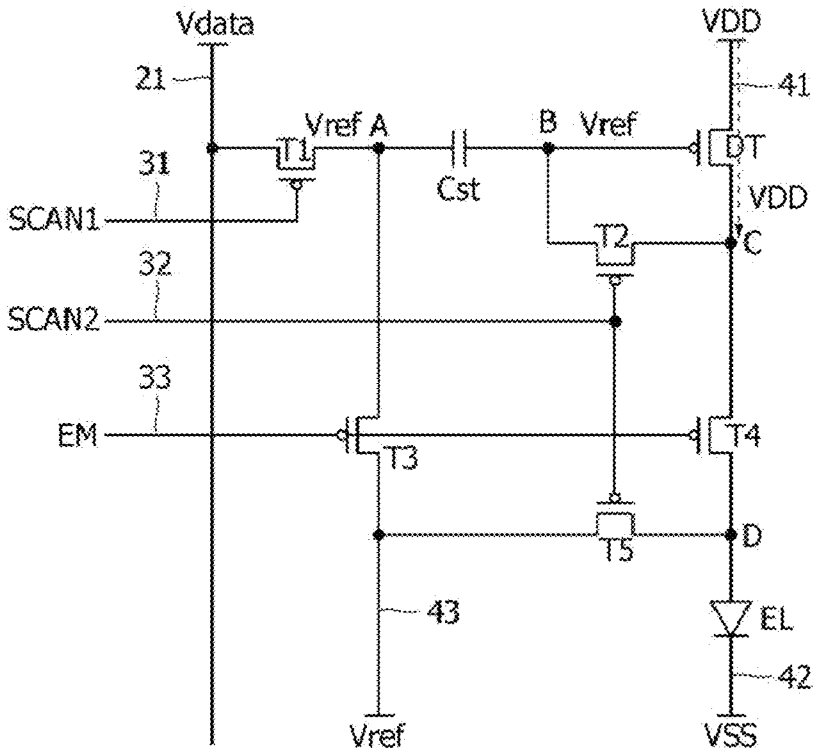
FIGS. 3A and 3B are diagrams illustrating a second step of the pixel circuit according to the first embodiment of the present disclosure.
Figure 3B:
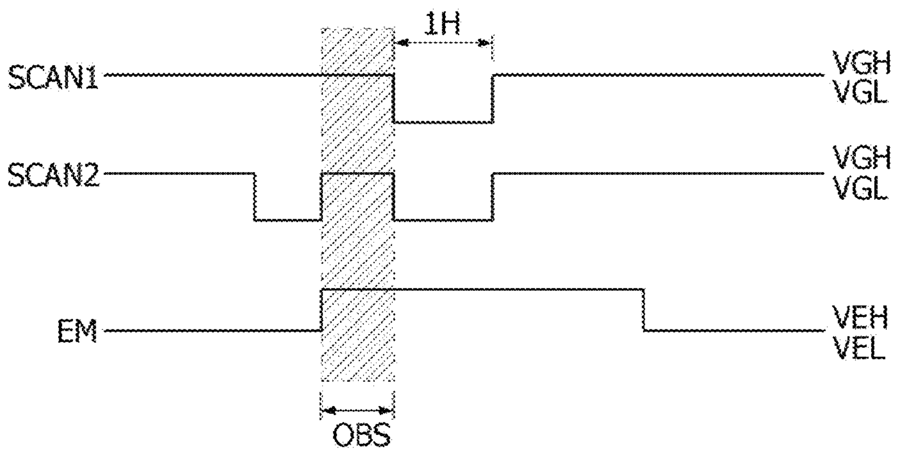

FIGS. 3A and 3B are diagrams illustrating the second step OBS of the pixel circuit of FIG. 1. FIG. 3A is a circuit diagram illustrating a flow of current in the pixel circuit and voltages of major nodes in the second step OBS. FIG. 3B is a waveform diagram of a gate signal supplied to the pixel circuit in the second step OBS.

Referring to FIGS. 3A and 3B, in the second step OBS, a pixel driving voltage VDD may be applied to the first and second electrodes of the driving element DT to form a drain-source channel of the driving element DT before the third step SAM, so that when a grayscale value of pixel data changes to a great extent, e.g., from black grayscale to white grayscale, a threshold voltage Vth necessary to change or invert a gate-source voltage Vgs of the driving element DT may be lowered. Through the second step OBS, when the threshold voltage Vth of the driving element DT is sampled, the driving element DT may be driven by the fixed gate-source voltage Vgs without being influenced by the threshold voltage Vth due to the gate-source voltage Vgs due to a previous data voltage, thereby forming a channel with the same threshold voltage Vth.

The driving element DT may form a drain-source channel determined by the fixed gate-source voltage Vgs without being influenced by the previous data voltage charged in the capacitor Cst.

In the second step OBS, a second scan pulse SCAN2 may be inverted to a gate-off voltage VGH and an EM pulse of the gate-off voltage VEH is generated. In this case, voltages of the first to third gate lines 31, 32, and 33 are gate-off voltages VGH and VEH. Thus, in the second step OBS, the first to fifth switch elements T1 to T5 are turned off and the driving element DT is maintained in an on state.

The driving element DT is turned on in the first step INI and is also maintained in the on state in the second step OBS. Therefore, in the second step OBS, a voltage of the third node C changes to a pixel driving voltage VDD and thus the driving element DT is driven with the gate-source voltage Vgs, a negative absolute value of which increases. The second step OBS is set at the same point in time for each frame and thus the driving element DT may be driven with the fixed or same gate-source voltage Vgs in the second step OBS for every frame period.

In the second step OBS, a voltage higher than the pixel driving voltage VDD may be applied to the first and second electrodes of the driving element VDD. In this case, an effect of the second step OBS may be improved. For example, in the second step OBS, the pixel driving voltage VDD may increase.

Figure 4A:
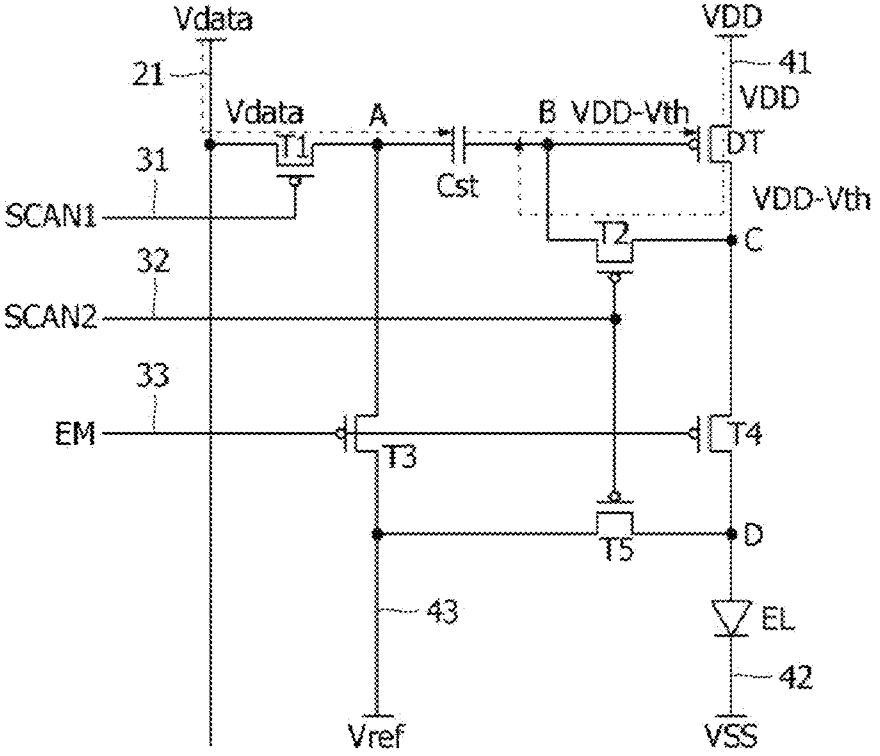
FIGS. 4A and 4B are diagrams illustrating a third step of the pixel circuit according to the first embodiment of the present disclosure.
Figure 4B:
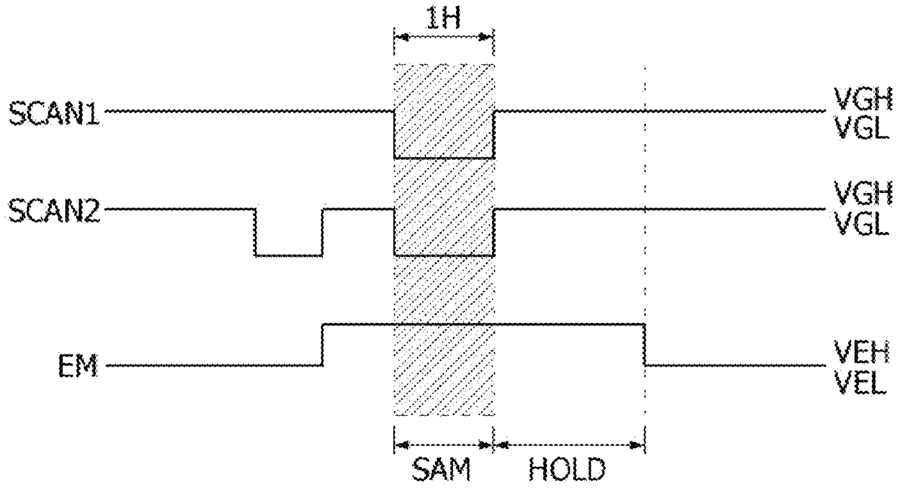

FIGS. 4A and 4B are diagrams illustrating the third step SAM of the pixel circuit of FIG. 1. FIG. 4A is a circuit diagram illustrating a flow of current in the pixel circuit and voltages of major nodes in the third step SAM. FIG. 4B is a waveform diagram of a gate signal supplied to the pixel circuit in the third step SAM.

Referring to FIGS. 4A and 4B, in the third step SAM, pixel data is written to the pixel circuit, and the threshold voltage Vth of the driving element DT is sampled and stored in the capacitor Cst.

In the third step SAM, first and second scan pulses SCAN1 and SCAN2 to be synchronized with a data voltage Vdata of the pixel data are generated to have the gate-on voltage VGL. In this case, the EM pulse EM is maintained at the gate-off voltage VEH. Therefore, in the third step SAM, the first, second, and fifth switch elements T1, T2, and T5 are turned on but the third and fourth switch elements T3 and T4 are in an off state.

In the third step SAM, the data voltage Vdata of the pixel data is applied to the first node A, and a voltage of the second node B changes to VDD-Vth. Here, "Vth" denotes a threshold voltage of the driving element DT. In the third step SAM, a voltage of the third node C changes from VDD to VDD-Vth.

A hold period HOLD may be set between the third step SAM and the fourth step EMI. During the hold period HOLD, the scan signals SCAN1 and SCAN2 are inverted to the gate-off voltage VGH. In this case, because voltages of the gate lines 31, 32, and 33 are the gate-off voltages VGH and VEH, all of the switch elements T1 to T5 may be turned off and the first, second, and fourth nodes A, B and D may be floated.

Figure 5A:
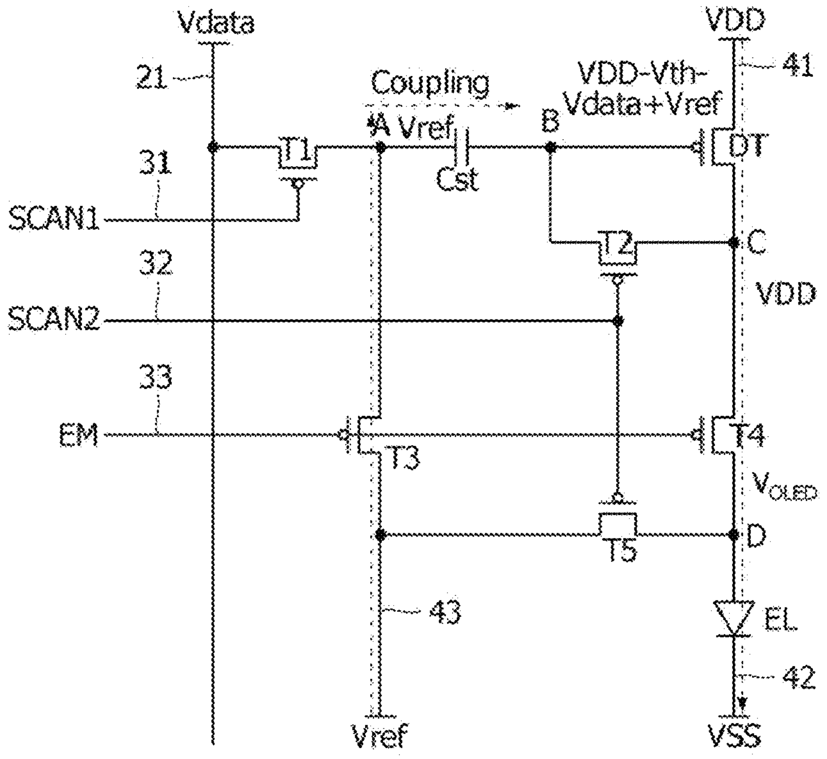
FIGS. 5A and 5B are diagrams illustrating a fourth step of the pixel circuit according to the first embodiment of the present disclosure.
Figure 5B:
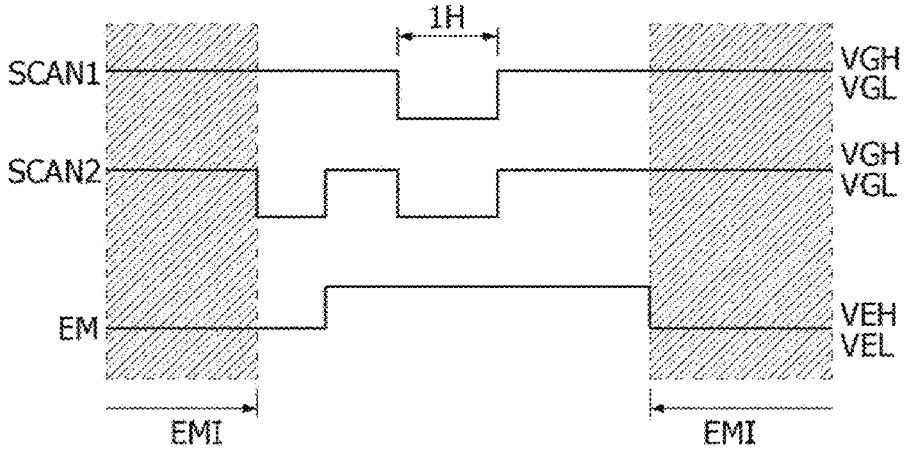

FIGS. 5A and 5B are diagrams illustrating the fourth step EMI of the pixel circuit of FIG. 1. FIG. 5A is a circuit diagram illustrating a flow of current in the pixel circuit and voltages of major nodes in the fourth step EMI. FIG. 5B is a waveform diagram of a gate signal supplied to the pixel circuit in the fourth step EMI.

Referring to FIGS. 5A and 5B, in the fourth step EMI, the EM pulse EM is inverted to the gate-on voltage VEL. In the fourth step EMI, voltages of the first and second gate lines 31 and 32 are the gate-off voltage VGH, and a voltage of the third gate line 33 is the gate-on voltage VEL. Therefore, in the fourth step EMI, the first, second, and fifth switch elements T1, T2, and T5 are turned off but the third and fourth switch elements T3 and T4 are turned on.

In the fourth step EMI, the reference voltage Vref is applied to the first node A to transmit the data voltage Vdata to the second node B through capacitor coupling.

In this case, a voltage of the second node B changes to VDD−Vth−Vdata+Vref, and a voltage of the fourth node D is an anode voltage $V_{OLED}$ of the light-emitting element EL determined by a channel current of the driving element DT. In the fourth step EMI, the light-emitting element EL may emit light according to a current from the driving element DT.

Figure 6A:
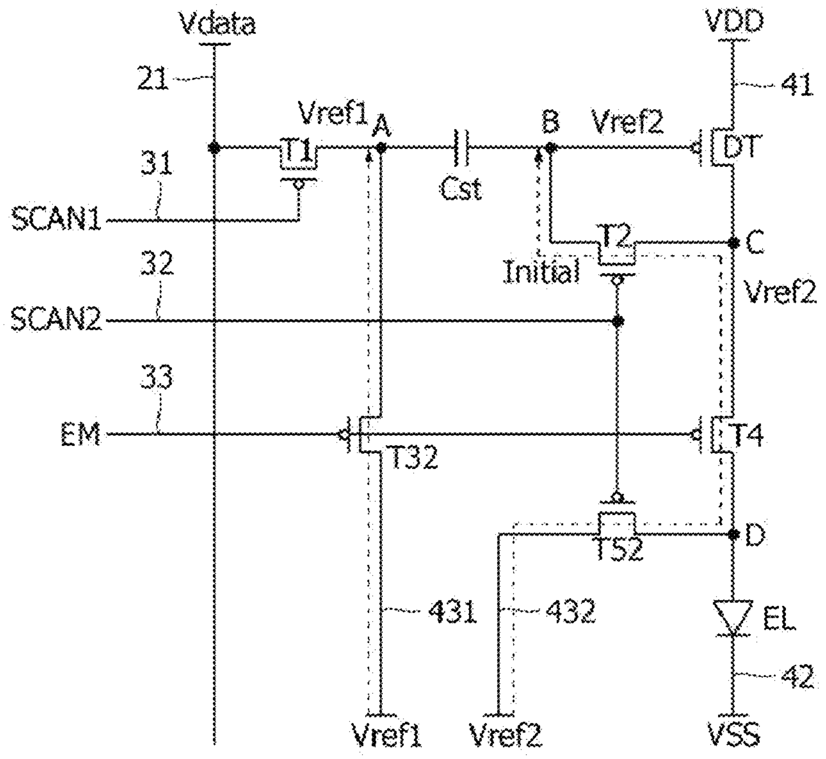
FIGS. 6A and 6B are diagrams illustrating a first step of a pixel circuit according to a second embodiment of the present disclosure.
Figure 6B:
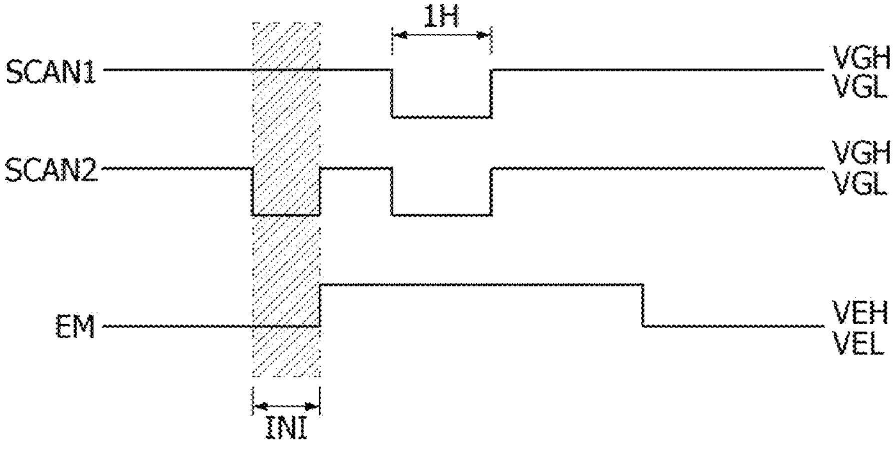

FIGS. 6A and 6B are diagrams illustrating a first step INI of a pixel circuit according to a second embodiment of the present disclosure. FIG. 6A is a circuit diagram illustrating a flow of current in the pixel circuit and voltages of major nodes in the first step INI. FIG. 6B is a waveform diagram of a gate signal supplied to the pixel circuit in the first step INI.

In the pixel circuit according to the second embodiment of the present disclosure, a reference voltage Vref may include at least a first reference voltage Vref1 and a second reference voltage Vref2. The first reference voltage Vref1 may be set to be substantially the same as that in the first embodiment described above to prevent a change in black luminance of pixels, and the second reference voltage Vref2 may be set to be lower than the first reference voltage Vref1 to improve an effect of the second step OBS. The second reference voltage Vref2 may be set to a voltage lower than the first reference voltage Vref1 and higher than a low-potential power supply voltage VSS. In the present embodiment, a second Vref line 432 to which the second reference voltage Vref2 is applied may be added as shown in FIG. 6A. As shown in FIGS. 6A, 7A, 8A, and 9A, the second embodiment is different from the first embodiment in that Vref lines 431 and 432 connected to third and fifth switch elements T32 and T52 are separated from each other, and the other components of the second embodiment are substantially the same as those of the first embodiment.

In the pixel circuit according to the second embodiment of the present disclosure, the same reference numerals are assigned to the components that are substantially the same as those of the first embodiment and detailed description thereof is omitted here. A gate signal supplied to the pixel circuit according to the second embodiment is substantially the same as that in the first embodiment described above.

In the pixel circuit according to the second embodiment of the present disclosure, the third switch element T32 includes a gate electrode connected to a third gate line 33, a first electrode connected to a first node A, and a second electrode connected to the first Vref line 431 to which the first reference voltage Vref1 is applied. The fifth switch element T52 includes a gate electrode connected to a second gate line 32, a first electrode connected to the second Vref line 432 to which the second reference voltage Vref2 is applied, and a second electrode connected to a fourth node D.

A driving method of the pixel circuit will be described in detail with reference to FIGS. 6A and 6B below. The pixel circuit may be drived by performing a first step INI, a second step OBS, a third step SAM, and a fourth step EMI.

In the first step INI, a second scan pulse SCAN2 of a gate-on voltage VGL is applied to the second gate line 32. In this case, a voltage of the first gate line 31 is a gate-off voltage VGH, and a voltage of the third gate line 33 is a gate-on voltage VEL. Thus, in the first step INI, second to fifth switch elements T2 to T52 are turned on to initialize major nodes A to D and a capacitor Cst.

In the first step INI, the first node A is initialized to the first reference voltage Vref1, and the second to fourth nodes B, C and D are initialized to the second reference voltage Vref2 lower than the first reference voltage Vref1. In the first step INI, a driving element DT is turned on and a light-emitting element EL is turned off.

Figure 7A:
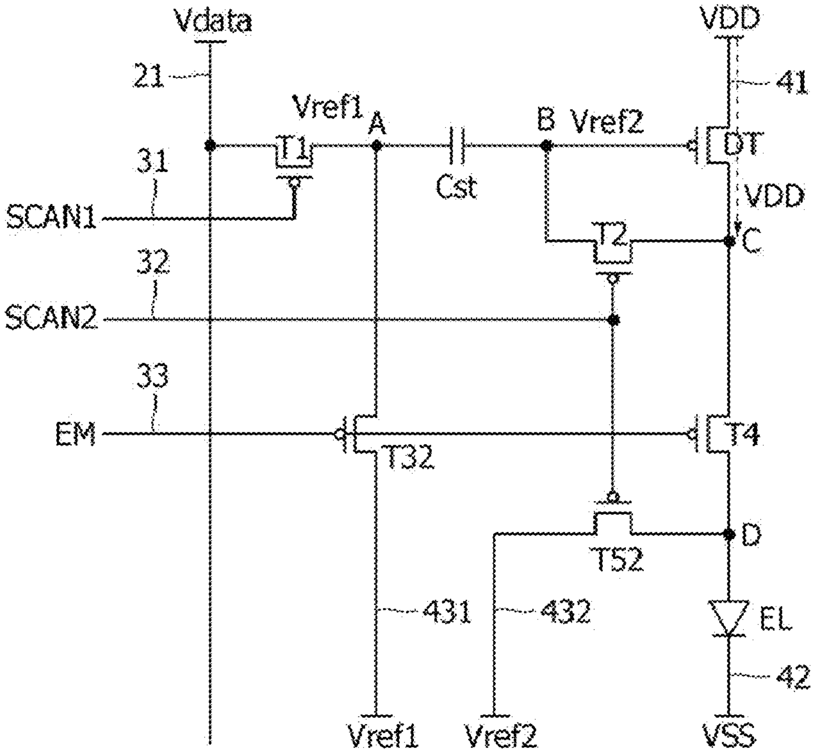
FIGS. 7A and 7B are diagrams illustrating a second step of the pixel circuit according to the second embodiment of the present disclosure.
Figure 7B:
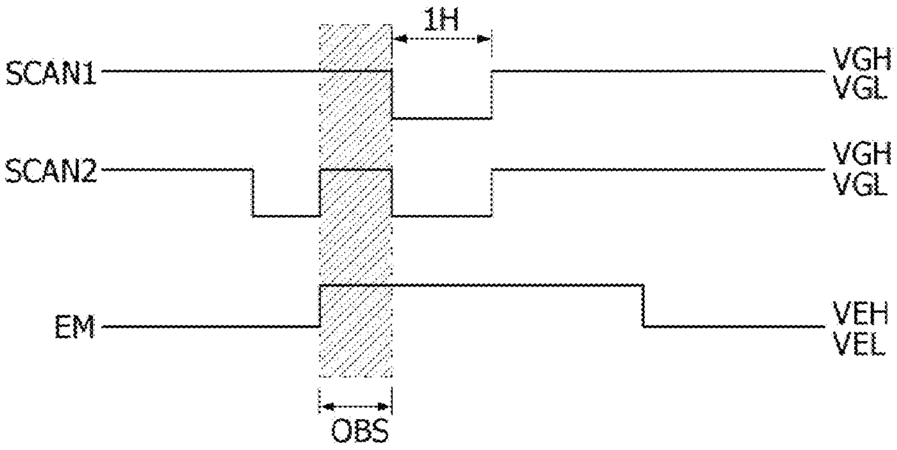

FIGS. 7A and 7B are diagrams illustrating a second step OBS of the pixel circuit according to the second embodiment of the present disclosure. FIG. 7A is a circuit diagram illustrating a flow of current in the pixel circuit and voltages of major nodes in the second step OBS. FIG. 7B is a waveform diagram of a gate signal supplied to the pixel circuit in the second step OBS.

Referring to FIGS. 7A and 7B, in the second step OBS, a pixel driving voltage VDD is applied to the first and second electrodes of the driving element DT to form a drain-source channel of the driving element DT in advance. In the second step OBS, when grayscale of pixel data changes to a large extent, e.g., from black grayscale to white grayscale, a threshold voltage Vth necessary to change or invert a gate-source voltage Vgs of the driving element DT may be lowered. Through the second step OBS, the driving element DT may form a drain-source channel determined by a fixed gate-source voltage Vgs without being influenced by a previous data voltage charged in the capacitor Cst.

In the second step OBS, a second scan pulse SCAN2 is inverted to a gate-off voltage VGH and an EM pulse of the gate-off voltage VEH is generated. In this case, voltages of the first to third gate lines 31, 32, and 33 are gate-off voltages VGH and VEH. Thus, in the second step OBS, the first to fifth switch elements T1 to T52 are turned off and the driving element DT is maintained in an on state.

In the second step OBS, a voltage of the first node A is the first reference voltage Vref1 and a voltage of the second node B is the second reference voltage Vref2. A voltage of the third node C is a pixel driving voltage VDD.

The driving element DT is turned on in the first step INI and is also maintained in the on state in the second step OBS. Therefore, in the second step OBS, the voltage of the third node C changes to the pixel driving voltage VDD and thus the driving element DT is driven with the gate-source voltage Vgs, a negative absolute value of which increases. The second step OBS is set at the same point in time for each frame and thus the driving element DT may be driven with the fixed or same gate-source voltage Vgs in the second step OBS for every frame period.

In the second step OBS, a voltage higher than the pixel driving voltage VDD may be applied to the first and second electrodes of the driving element VDD. In this case, an effect of the second step OBS may be further improved.

Figure 8A:
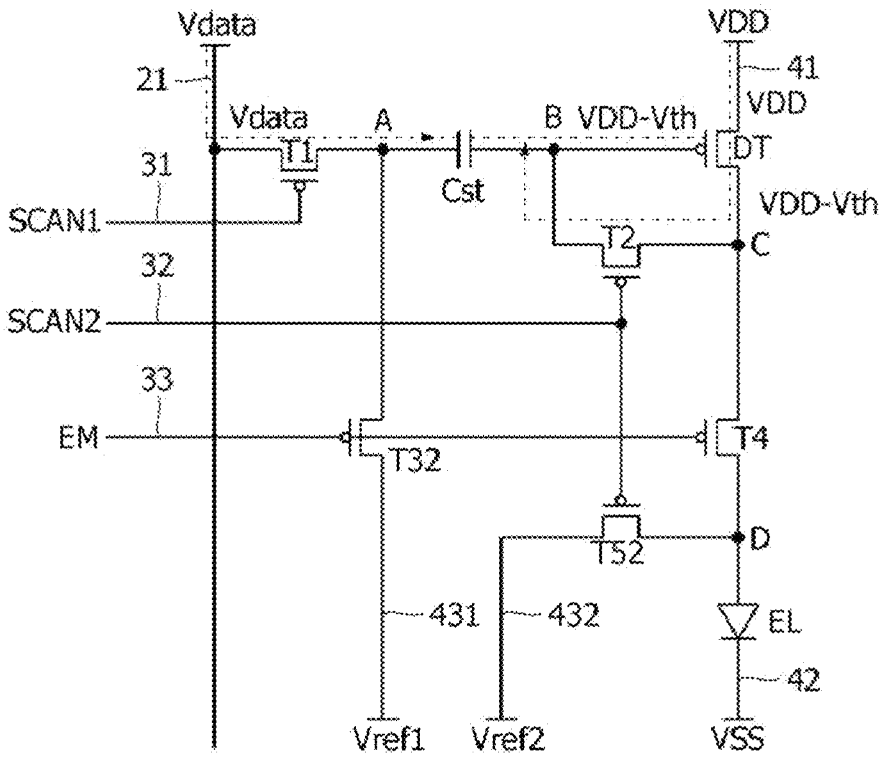
FIGS. 8A and 8B are diagrams illustrating a third step of the pixel circuit according to the second embodiment of the present disclosure.
Figure 8B:
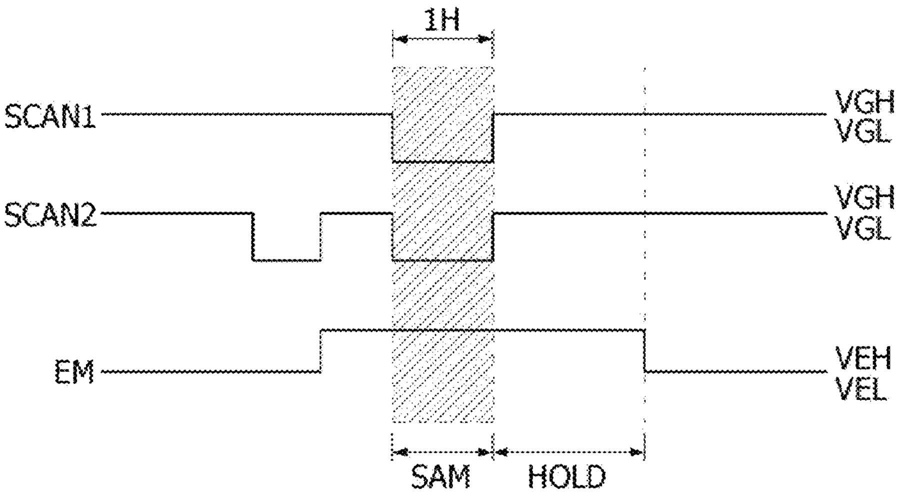

FIGS. 8A and 8B are diagrams illustrating the third step SAM of the pixel circuit according to the second embodiment of the present disclosure. FIG. 8A is a circuit diagram illustrating a flow of current in the pixel circuit and voltages of major nodes in the third step SAM. FIG. 8B is a waveform diagram of a gate signal supplied to the pixel circuit in the third step SAM.

Referring to FIGS. 8A and 8B, in the third step SAM, pixel data is written to the pixel circuit, and a threshold voltage Vth of the driving element DT is sampled and stored in the capacitor Cst.

In the third step SAM, first and second scan pulses SCAN1 and SCAN2 to be synchronized with a data voltage Vdata of the pixel data are generated to have the gate-on voltage VGL. In this case, the EM pulse EM is maintained at the gate-off voltage VEH. Therefore, in the third step SAM, the first, second, and fifth switch elements T1, T2, and T52 are turned on but the third and fourth switch elements T32 and T4 are in an off state.

In the third step SAM, the data voltage Vdata of the pixel data is applied to the first node A, and a voltage of the second node B changes to VDD-Vth. In the third step SAM, a voltage of the third node C changes from VDD to VDD-Vth.

A hold period HOLD may be set between the third step SAM and the fourth step EMI. During the hold period HOLD, the scan signals SCAN1 and SCAN2 are inverted to the gate-off voltage VGH. In this case, because voltages of the gate lines 31, 32, and 33 are the gate-off voltages VGH and VEH, all of the switch elements T1 to T52 may be turned off and the first, second, and fourth nodes A, B and D may be floated.

Figure 9A:
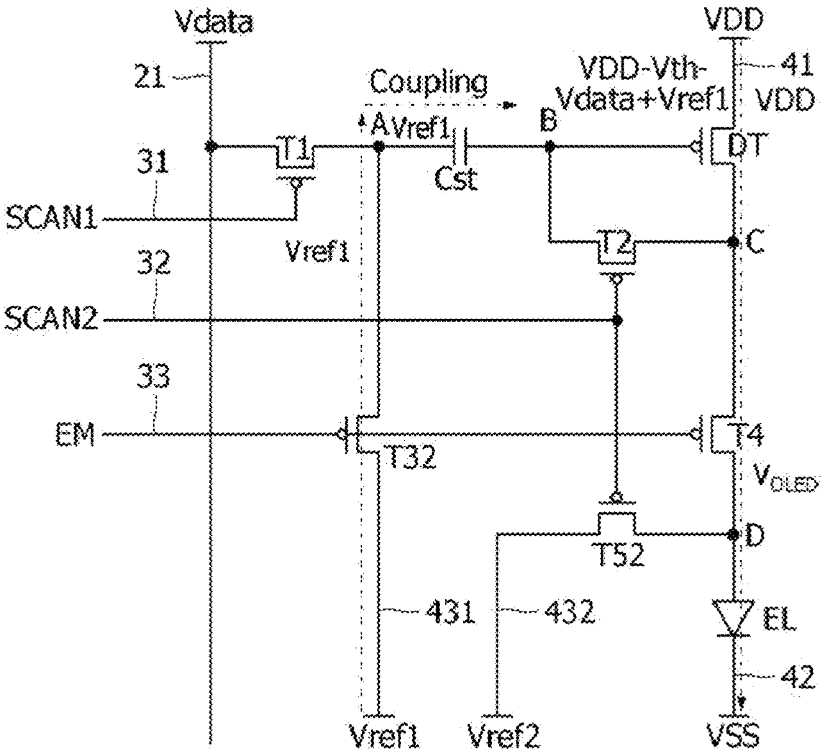
FIGS. 9A and 9B are diagrams illustrating a fourth step of the pixel circuit according to the second embodiment of the present disclosure.
Figure 9B:
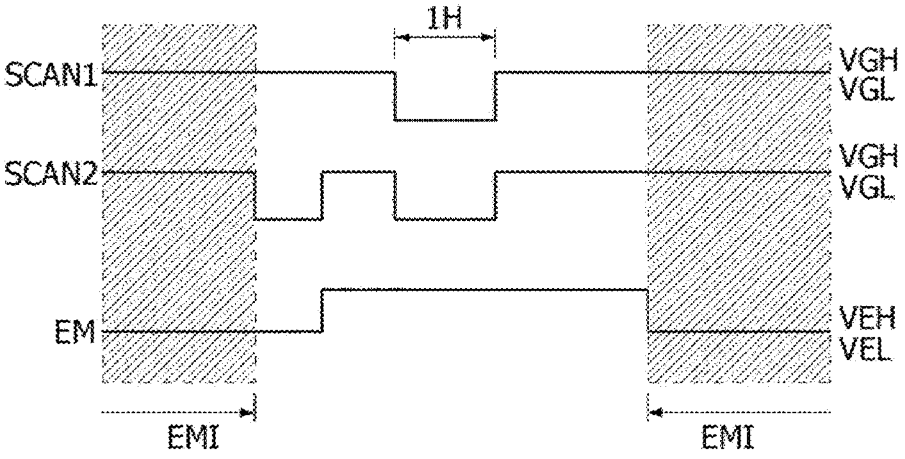

FIGS. 9A and 9B are diagrams illustrating a fourth step EMI of the pixel circuit according to the second embodiment of the present disclosure. FIG. 9A is a circuit diagram illustrating a flow of current in the pixel circuit and voltages of major nodes in the fourth step EMI. FIG. 9B is a waveform diagram of a gate signal supplied to the pixel circuit in the fourth step EMI.

Referring to FIGS. 9A and 9B, in the fourth step EMI, the EM pulse EM is inverted to the gate-on voltage VEL. In the fourth step EMI, voltages of the first and second gate lines 31 and 32 are the gate-off voltage VGH, and a voltage of the third gate line 33 is the gate-on voltage VEL. Therefore, in the fourth step EMI, the first, second, and fifth switch elements T1, T2, and T52 are turned off but the third and fourth switch elements T32 and T4 are turned on.

In the fourth step EMI, the first reference voltage Vref1 is applied to the first node A to transmit the data voltage Vdata to the second node B through capacitor coupling. In this case, the voltage of the second node B changes to VDD−Vth−Vdata+Vref1, and a voltage of the fourth node D is an anode voltage $V_{OLED}$ of the light-emitting element EL determined by a channel current of the driving element DT. In the fourth step EMI, the light-emitting element EL may emit light according to a current from the driving element DT.

As shown in FIGS. 10A to 14B, a pixel circuit according to a third embodiment of the disclosure may be driven by performing a first step (or an initialization step) INI of initializing the pixel circuit, a second step (or a first compensation step) OBS1 of forming a drain-source channel of the driving element DT before sampling a threshold voltage Vth of the driving element DT, a third step (a sampling step) SAM of writing pixel data to the pixel circuit and sampling the threshold voltage Vth of the driving element DT, a fourth step (or a second compensation step) OBS2 of forming a channel of the driving element DT without interfering with the anode voltage of the light-emitting element EL, and a fifth step (or an step of driving a light-emitting element) EMI of driving the light-emitting element EL.

In the pixel circuit according to the third embodiment of the present disclosure, the same reference numerals are assigned to the components that are substantially the same as those of the first embodiment and a detailed description thereof is omitted here.

Figure 10A:
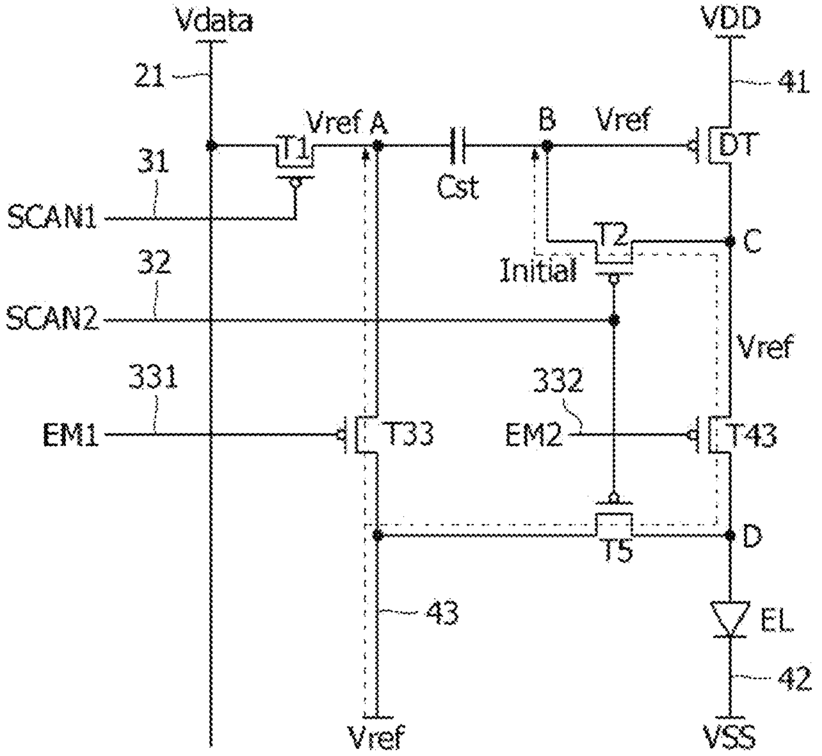
FIGS. 10A and 10B are diagrams illustrating a first step of a pixel circuit according to a third embodiment of the present disclosure.

As shown in FIG. 10A, in the pixel circuit according to the third embodiment of the present disclosure, a third switch element T33 includes a gate electrode connected to a third gate line 331 to which a first EM pulse EM1 is supplied, a first electrode connected to a first node A, and a second electrode connected to a Vref line 43 to which a reference voltage Vref is applied. A fourth switch element T43 includes a gate electrode connected to a fourth gate line 332 to which a second EM pulse EM2 is supplied, a first electrode connected to a third node C, and a second electrode connected to a fourth node D.

The first EM pulse EM1 is generated to have a gate-off voltage VEH at a timing when the second step OBS1 starts, and is inverted to a gate-on voltage VEL at a timing when the fourth step OBS2 starts. A voltage of the first EM pulse EM1 is the gate-on voltage VEL in at least some sections of the fifth step EMI. The second EM pulse EM2 is rising simultaneously with the first EM pulse EM1 and is falling later than the first EM pulse EM1. The second EM pulse EM2 is generated to have the gate-off voltage VEH at a timing when the second step OBS1 starts, is maintained at the gate-off voltage VEH, and is inverted to the gate-on voltage VEL in the fifth step EMI.

Figure 10B:
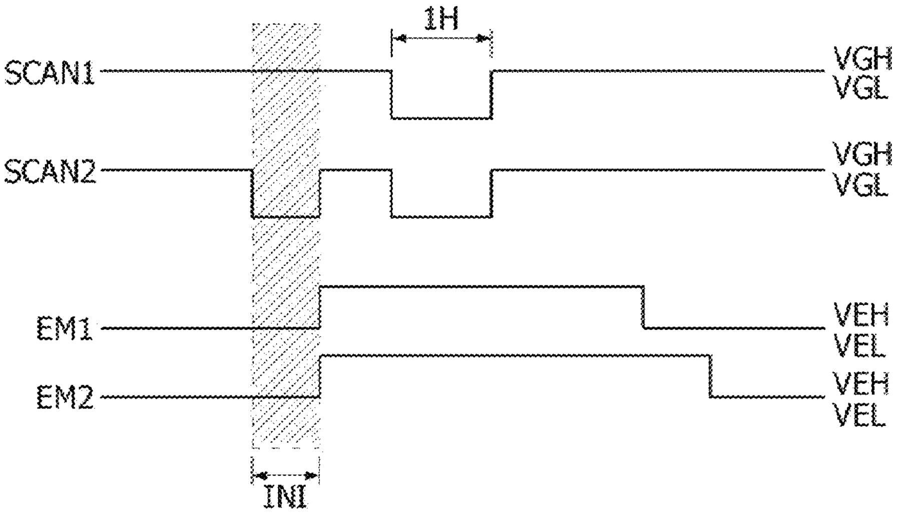

FIGS. 10A and 10B are diagrams illustrating the first step INI of a pixel circuit according to the third embodiment of the present disclosure. FIG. 10A is a circuit diagram illustrating a flow of current in the pixel circuit and voltages of major nodes in the first step INI. FIG. 10B is a waveform diagram of a gate signal supplied to the pixel circuit in the first step INI.

Referring to FIGS. 10A and 10B, a second scan pulse SCAN2 of a gate-on voltage VGL is supplied to a second gate line 32 in the first step INI. In this case, a voltage of a first gate line 31 is a gate-off voltage VGH, and a voltage of a third gate line 331 is a gate-on voltage VEL. Thus, in the first step INI, second to fifth switch elements T2 to T5 are turned on to initialize major nodes A to D and a capacitor Cst.

In the first step INI, first to fourth nodes A to D are initialized to a reference voltage Vref. In the first step INI, a driving element DT is turned on and a light-emitting element EL is turned off.

Figure 11A:
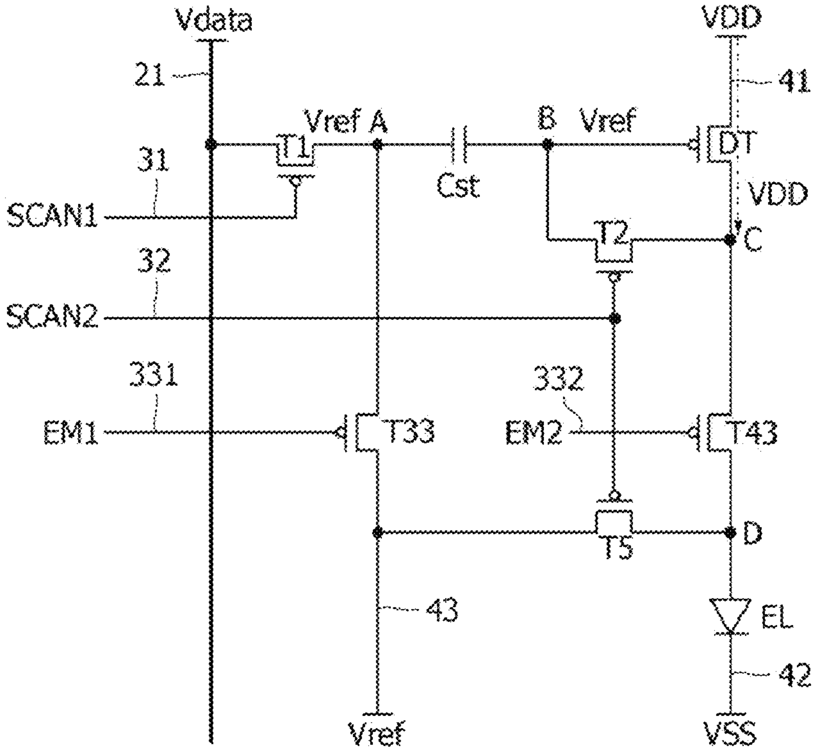
FIGS. 11A and 11B are diagrams illustrating a second step of the pixel circuit according to the third embodiment of the present disclosure.
Figure 11B:
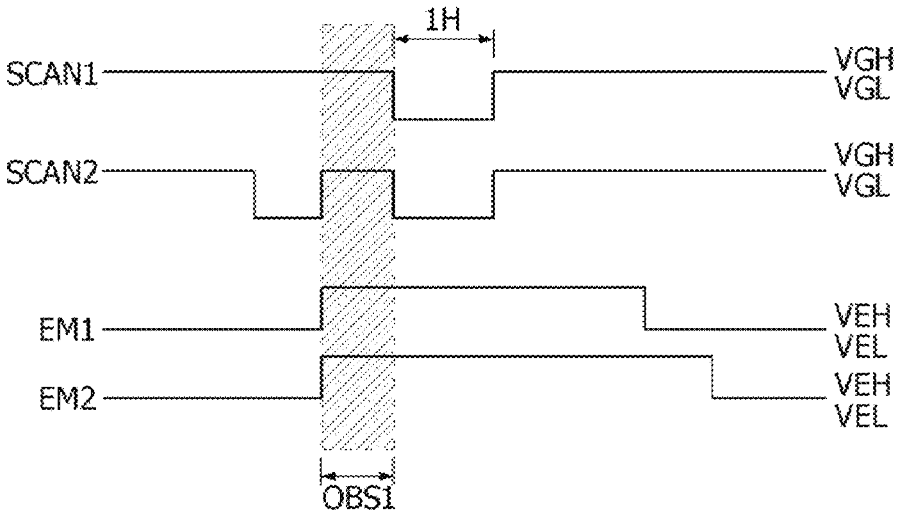

FIGS. 11A and 11B are diagrams illustrating the second step OBS1 of the pixel circuit according to the third embodiment of the present disclosure. FIG. 11A is a circuit diagram illustrating a flow of current in the pixel circuit and voltages of major nodes in the second step OBS1. FIG. 11B is a waveform diagram of a gate signal supplied to the pixel circuit in the second step OBS1.

Referring to FIGS. 11A and 11B, in the second step OBS1, a pixel driving voltage VDD is applied to first and second electrodes of the driving element DT to form a drain-source channel of the driving element DT in advance. In the second step OBS1, when grayscale of pixel data changes to a large extent, e.g., from black grayscale to white grayscale, a threshold voltage Vth necessary to change or invert a gate-source voltage Vgs of the driving element DT may be lowered. Through the second step OBS1, the driving element DT may form a drain-source channel determined by a fixed gate-source voltage Vgs without being influenced by a previous data voltage charged in the capacitor Cst.

In the second step OBS1, the second scan pulse SCAN2 may be inverted to a gate-off voltage VGH, and first and second EM pulses EM1 and EM2 of the gate-off voltage VEH are generated. In this case, voltages of first to fourth gate lines 31 to 332 are gate-off voltages VGH and VEH. Thus, in the second step OBS1, the first to fifth switch elements T1 to T5 are turned off and the driving element DT is maintained in an on state.

In the second step OBS1, voltages of first and second nodes A and B are the reference voltage Vref, and a voltage of the third node C is the pixel driving voltage VDD.

In the second step OBS1, a voltage higher than the pixel driving voltage VDD may be applied to the first and second electrodes of the driving element VDD. In this case, an effect of the second step OBS1 may be further improved.

Figure 12A:
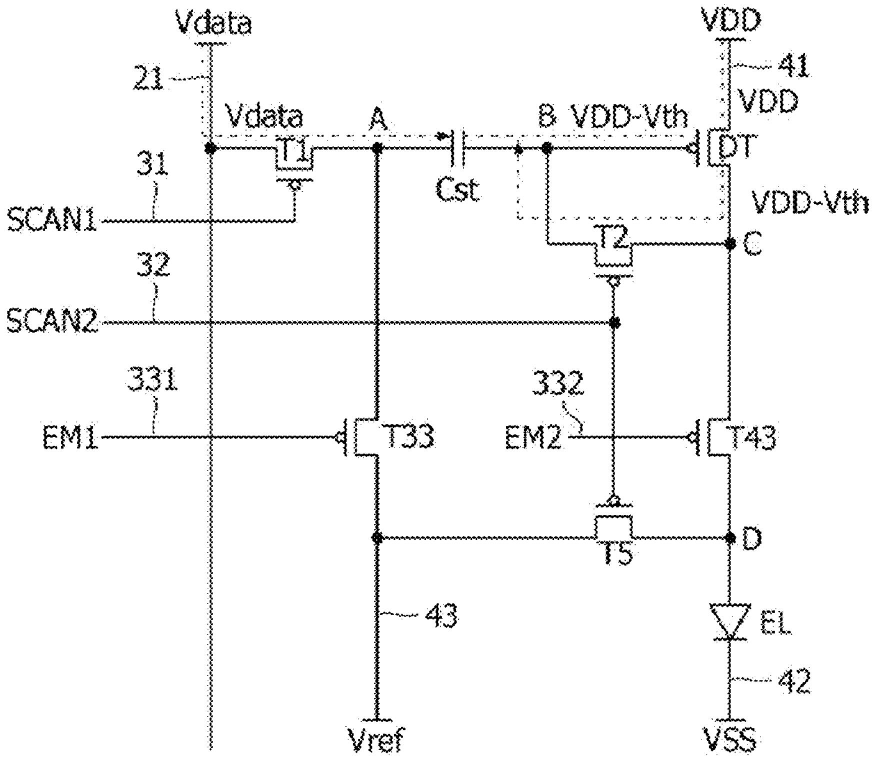
FIGS. 12A and 12B are diagrams illustrating a third step of the pixel circuit according to the third embodiment of the present disclosure.
Figure 12B:
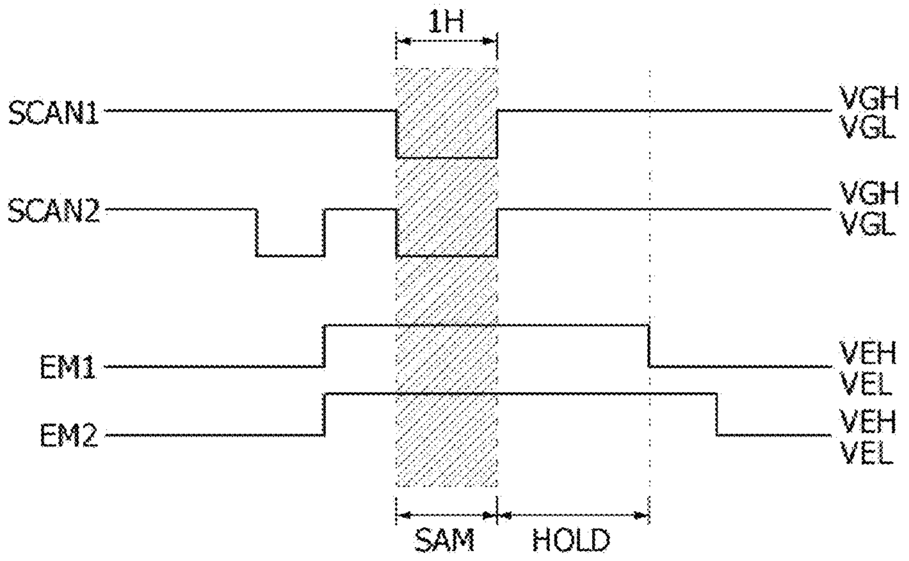

FIGS. 12A and 12B are diagrams illustrating the third step SAM of the pixel circuit according to the third embodiment of the present disclosure. FIG. 12A is a circuit diagram illustrating a flow of current in the pixel circuit and voltages of major nodes in the third step SAM. FIG. 12B is a waveform diagram of a gate signal supplied to the pixel circuit in the third step SAM.

Referring to FIGS. 12A and 12B, in the third step SAM, pixel data is written to the pixel circuit, and the threshold voltage Vth of the driving element DT is sampled and stored in the capacitor Cst.

In the third step SAM, first and second scan pulses SCAN1 and SCAN2 to be synchronized with a data voltage Vdata of the pixel data are generated to have the gate-on voltage VGL. In this case, the first and second EM pulses EM1 and EM2 are maintained at the gate-off voltage VEH. Therefore, in the third step SAM, the first, second, and fifth switch elements T1, T2, and T5 are turned on but the third and fourth switch elements T33 and T43 are in an off state.

In the third step SAM, the data voltage Vdata of the pixel data is applied to the first node A, and a voltage of the second node B changes to VDD-Vth. In the third step SAM, a voltage of the third node C changes from VDD to VDD-Vth.

A hold period HOLD may be set between the third step SAM and the fourth step EMI. During the hold period HOLD, the scan signals SCAN1 and SCAN2 are inverted to the gate-off voltage VGH. In this case, because voltages of the gate lines 31, 32, and 331 are the gate-off voltages VGH and VEH, all of the switch elements T1 to T5 may be turned off and the first, second, and fourth nodes A, B and D may be floated.

Figure 13A:
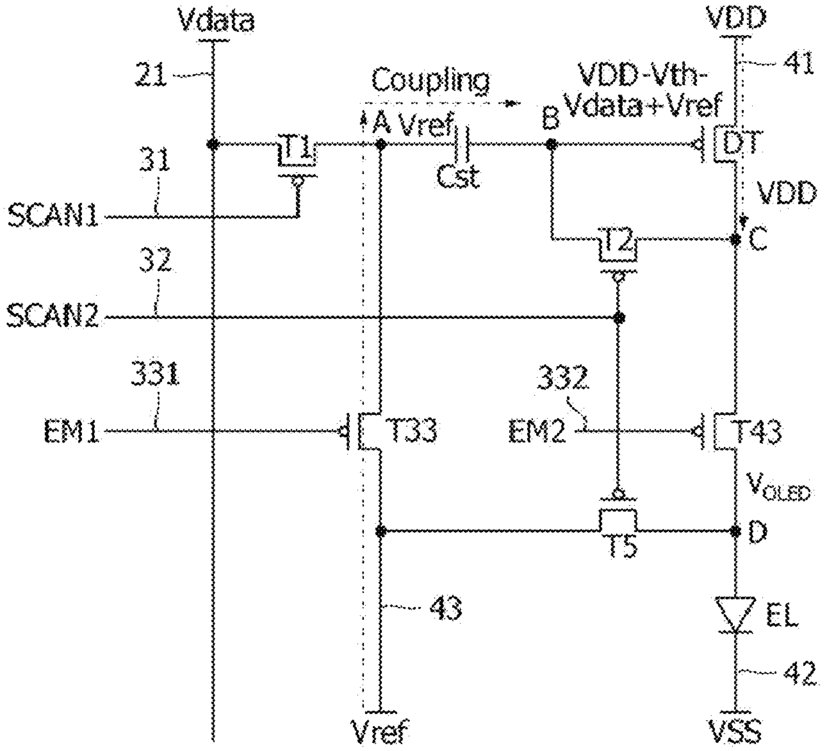
FIGS. 13A and 13B are diagrams illustrating a fourth step of the pixel circuit according to the third embodiment of the present disclosure.
Figure 13B:
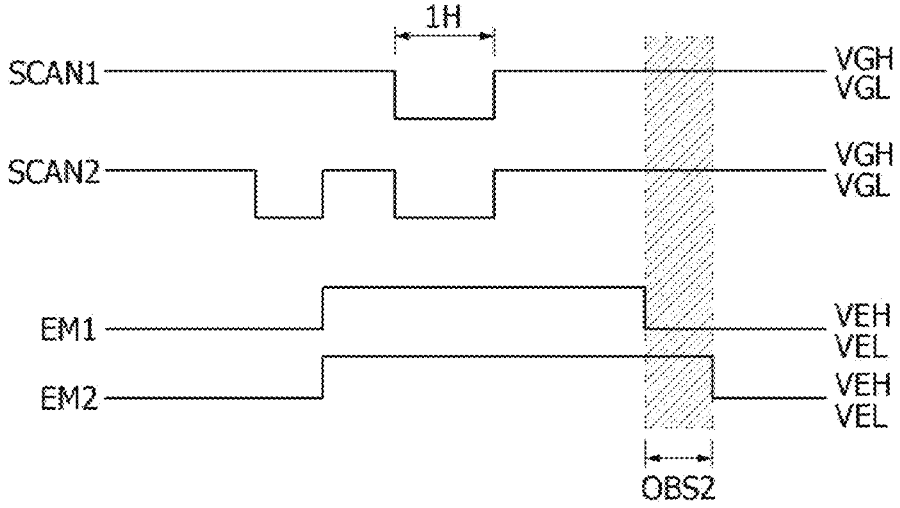

FIGS. 13A and 13B are diagrams illustrating the fourth step OBS2 of the pixel circuit according to the third embodiment of the present disclosure. FIG. 13A is a circuit diagram illustrating a flow of current in the pixel circuit and voltages of major nodes in the fourth step OBS2. FIG. 13B is a waveform diagram of a gate signal supplied to the pixel circuit in the fourth step OBS2.

Referring to FIGS. 13A and 13B, in the fourth step OBS2, a drain-source channel of the driving element DT is formed by applying the pixel driving voltage VDD to the first and second electrodes of the driving element DT while transmitting the data voltage Vdata to the second node B by applying the reference voltage Vref to the first node A. In the fourth step OBS2, before the fifth step EMI, the threshold voltage Vth of the driving element DT may be set similar to that in the third step SAM without interfering with a voltage of the fourth node D, i.e., an anode voltage $V_{OLED}$, to prevent a decay in luminance when grayscale of the pixel data changes to a large extent, e.g., at a first frame at which reproduction of an input image starts.

In the fourth step OBS2, the first EM pulse EM1 is inverted to the gate-on voltage VEL. In this case, voltages of the gate lines 31, 32, and 332 to which the scan pulses SCAN1 and SCAN2 and the second EM pulse EM2 are applied are gate-off voltages VGH and VEH. Therefore, in the fourth step OBS2, the third switch element T33 and the driving element DT are turned on and the first, second, fourth and fifth switch elements T1, T2, T43 and T5 are turned off.

In the fourth step OBS2, a voltage of the first node A is the reference voltage Vref and a voltage of the second node B is VDD−Vth−Vdata+Vref. In this case, a voltage of the third node C is the pixel driving voltage VDD.

In the fourth step OBS2, a voltage higher than the pixel driving voltage VDD may be applied to the first and second electrodes of the driving element VDD.

Figure 14A:
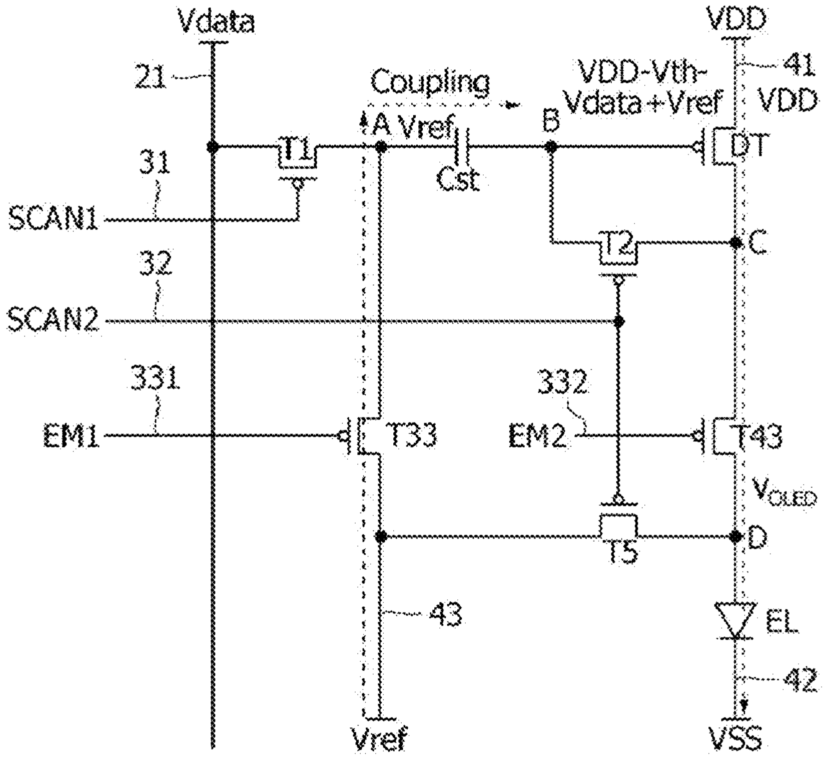
FIGS. 14A and 14B are diagrams illustrating a fifth step of the pixel circuit according to the third embodiment of the present disclosure.
Figure 14B:
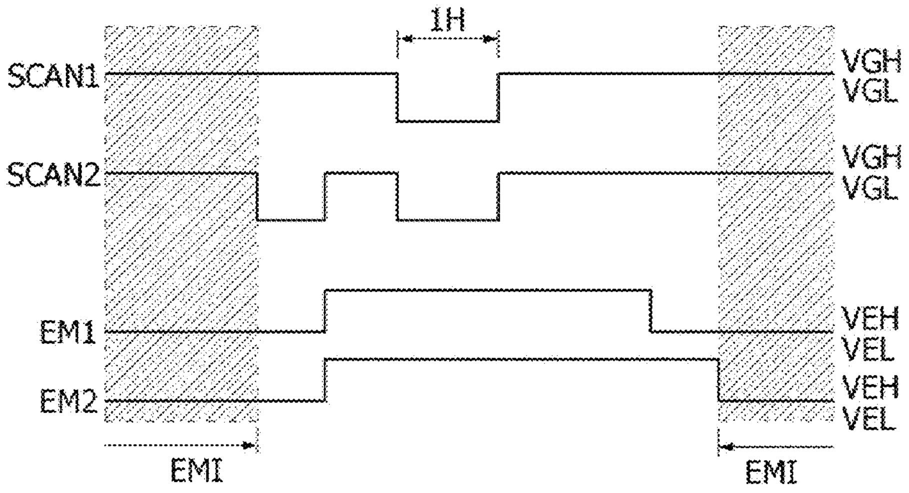

FIGS. 14A and 14B are diagrams illustrating the fifth step EMI of the pixel circuit according to the third embodiment of the present disclosure. FIG. 14A is a circuit diagram illustrating a flow of current in the pixel circuit and voltages of major nodes in the fifth step EMI. FIG. 14B is a waveform diagram of a gate signal supplied to the pixel circuit in the fifth step EMI.

Referring to FIGS. 14A and 14B, in the fifth step EMI, the second EM pulse EM2 is inverted to the gate-on voltage VEL. In the fifth step EMI, voltages of the gate lines 31 and 32 to which the scan pulses SCAN1 and SCAN2 are applied are the gate-off voltage VGH, and voltages of the gate lines 331 and 332 to which the EM pulses EM1 and EM2 are applied are the gate-on voltage VEL. Therefore, in the fifth step EMI, the first, second, and fifth switch elements T1, T2, and T5 are turned off but the third and fourth switch elements T33 and T43 are turned on.

In the fifth step EMI, the reference voltage Vref is applied to the first node A to transmit the data voltage Vdata to the second node B. In this case, a voltage of the second node B is VDD−Vth−Vdata+Vref, and a voltage of the fourth node D is an anode voltage $V_{OLED}$ of the light-emitting element EL. In the fifth step EMI, the light-emitting element EL may emit light according to a current from the driving element DT.

A pixel circuit according to a fourth embodiment of the present disclosure is substantially the same as the pixel circuit of the second embodiment described above and is driven by the gate signals that are set in the third embodiment. The pixel circuit according to the fourth embodiment of the present disclosure will be described with reference to FIGS. 15A to 19B, in which parts that are substantially the same as those in the second and third embodiments are assigned the same reference numerals and detailed description thereof is omitted.

Figure 15A:
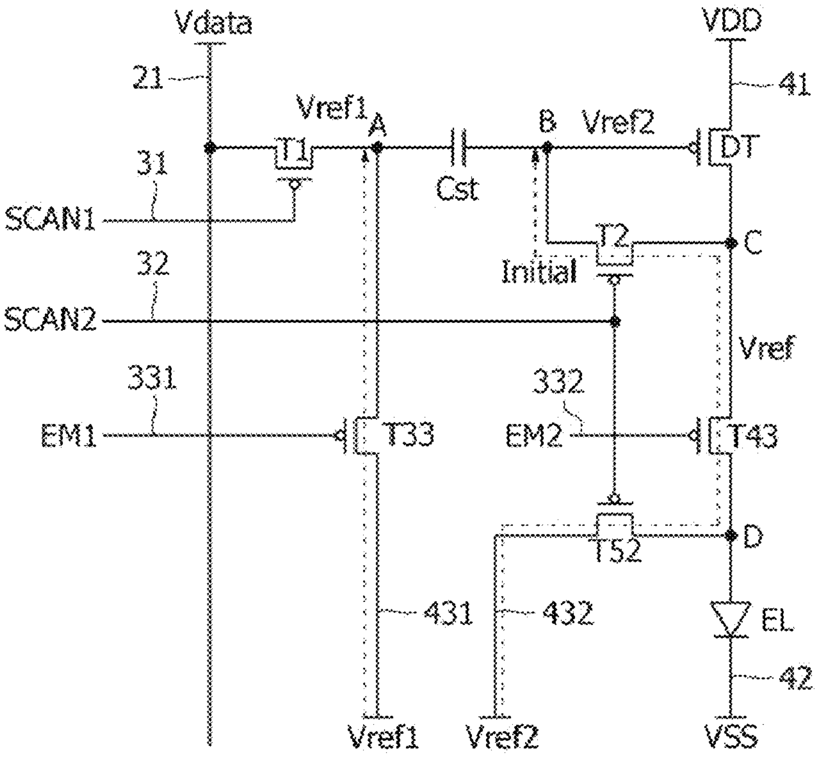
FIGS. 15A and 15B are diagrams illustrating a first step of a pixel circuit according to a fourth embodiment of the present disclosure.

As shown in FIG. 15A, in the pixel circuit according to the fourth embodiment of the present disclosure, a third switch element T33 includes a gate electrode connected to a third gate line 331 to which a first EM pulse EM1 is supplied, a first electrode connected to a first node A, and a second electrode connected to a Vref line 431 to which a first reference voltage Vref1 is applied. A fourth switch element T43 includes a gate electrode connected to a fourth gate line 332 to which a second EM pulse EM2 is supplied, a first electrode connected to a third node C, and a second electrode connected to a fourth node D. A fifth switch element T52 includes a gate electrode connected to a second gate line 32, a first electrode connected to a second Vref line 432 to which a second reference voltage Vref2 is applied, and a second electrode connected to the fourth node D. The second reference voltage Vref2 may be set to a voltage lower than the first reference voltage Vref1.

Figure 15B:
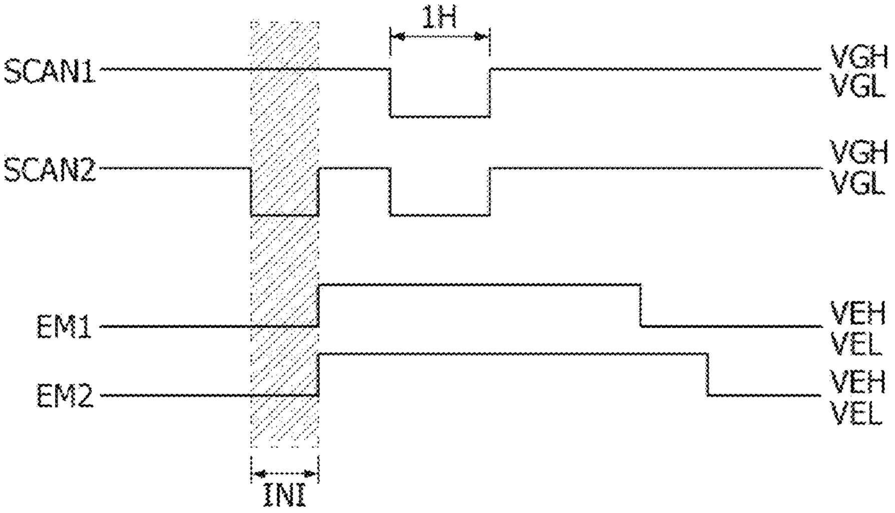

FIGS. 15A and 15B are diagrams illustrating a first step INI of the pixel circuit according to the fourth embodiment of the present disclosure. FIG. 15A is a circuit diagram illustrating a flow of current in the pixel circuit and voltages of major nodes in the first step INI. FIG. 15B is a waveform diagram of a gate signal supplied to the pixel circuit in the first step INI.

Referring to FIGS. 15A and 15B, a second scan pulse SCAN2 of a gate-on voltage VGL is supplied to a second gate line 32 in the first step INI. In this case, a voltage of a first gate line 31 is a gate-off voltage VGH, and voltages of third and fourth gate lines 331 and 332 are a gate-on voltage VEL. Thus, in the first step INI, second to fifth switch elements T2 to T52 are turned on to initialize major nodes A to D and a capacitor Cst.

In the first step INI, the first node A is initialized to a first reference voltage Vref1, and the second to fourth nodes B to D are initialized to a second reference voltage Vref2. In the first step INI, the driving element DT is turned on and the light-emitting element EL is turned off.

Figure 16A:
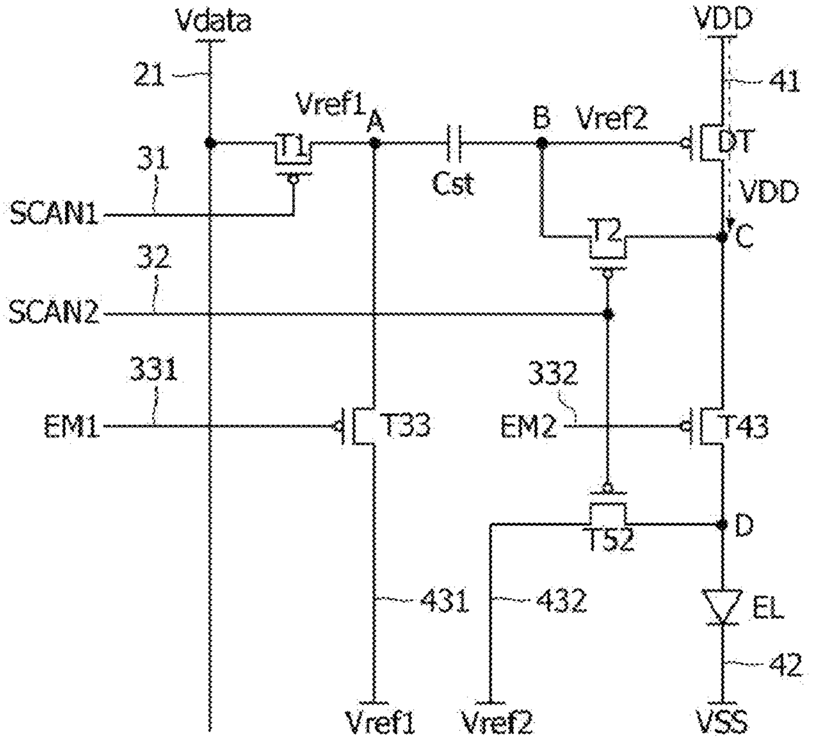
FIGS. 16A and 16B are diagrams illustrating a second step of the pixel circuit according to the fourth embodiment of the present disclosure.
Figure 16B:
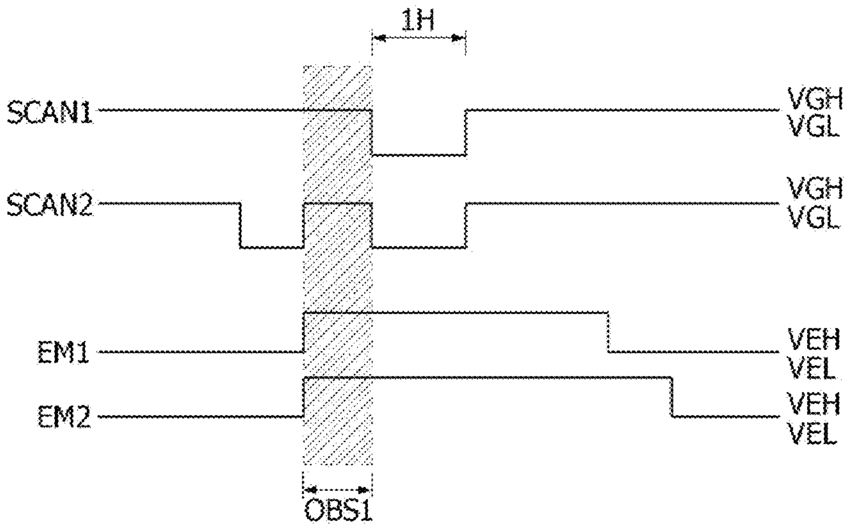

FIGS. 16A and 16B are diagrams illustrating a second step OBS1 of the pixel circuit according to the fourth embodiment of the present disclosure. FIG. 16A is a circuit diagram illustrating a flow of current in the pixel circuit and voltages of major nodes in the second step OBS1. FIG. 16B is a waveform diagram of a gate signal supplied to the pixel circuit in the second step OBS1.

Referring to FIGS. 16A and 16B, in the second step OBS1, a pixel driving voltage VDD is applied to first and second electrodes of the driving element DT to form a drain-source channel of the driving element DT in advance.

In the second step OBS1, the second scan pulse SCAN2 may be inverted to a gate-off voltage VGH, and first and second EM pulses EM1 and EM2 of the gate-off voltage VEH are generated. In this case, voltages of first to fourth gate lines 31 to 332 are gate-off voltages VGH and VEH. Thus, in the second step OBS1, the first to fifth switch elements T1 to T52 are turned off and the driving element DT is maintained in an on state.

In the second step OBS1, a voltage of the first node A is the first reference voltage Vref1 and a voltage of the second node B is the second reference voltage Vref2. In this case, a voltage of the third node C is the pixel driving voltage VDD.

In the second step OBS1, a voltage higher than the pixel driving voltage VDD may be applied to the first and second electrodes of the driving element VDD. In this case, an effect of the second step OBS1 may be further improved.

Figure 17A:
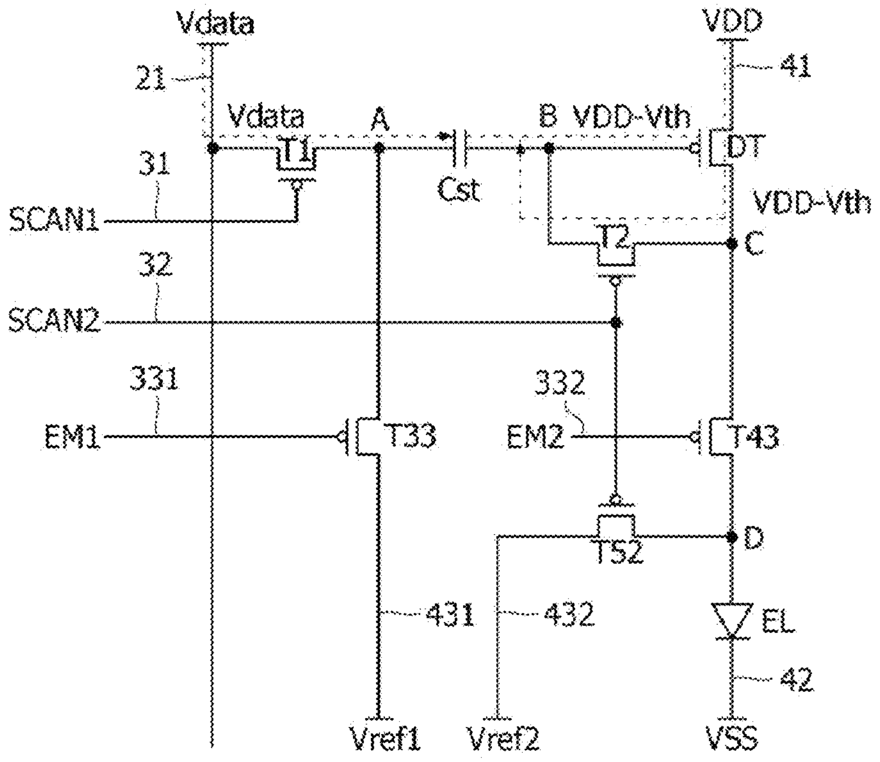
FIGS. 17A and 17B are diagrams illustrating a third step of the pixel circuit according to the fourth embodiment of the present disclosure.
Figure 17B:
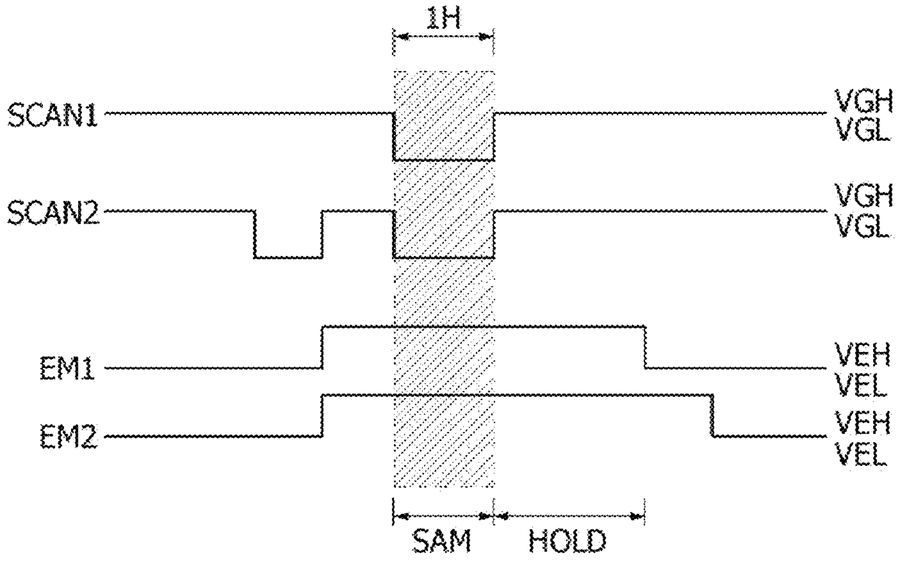

FIGS. 17A and 17B are diagrams illustrating a third step SAM of the pixel circuit according to the fourth embodiment of the present disclosure. FIG. 17A is a circuit diagram illustrating a flow of current in the pixel circuit and voltages of major nodes in the third step SAM. FIG. 17B is a waveform diagram of a gate signal supplied to the pixel circuit in the third step SAM.

Referring to FIGS. 17A and 17B, in the third step SAM, pixel data is written to the pixel circuit, and the threshold voltage Vth of the driving element DT is sampled and stored in the capacitor Cst.

In the third step SAM, first and second scan pulses SCAN1 and SCAN2 to be synchronized with a data voltage Vdata of the pixel data are generated to have the gate-on voltage VGL. In this case, the first and second EM pulses EM1 and EM2 are maintained at the gate-off voltage VEH. Therefore, in the third step SAM, the first, second, and fifth switch elements T1, T2, and T52 are turned on but the third and fourth switch elements T33 and T43 are in an off state.

In the third step SAM, the data voltage Vdata of the pixel data is applied to the first node A, and a voltage of the second node B changes to VDD−Vth. In the third step SAM, a voltage of the third node C changes from VDD to VDD−Vth.

A hold period HOLD may be set between the third step SAM and the fourth step EMI. During the hold period HOLD, the scan signals SCAN1 and SCAN2 are inverted to the gate-off voltage VGH.

Figure 18A:
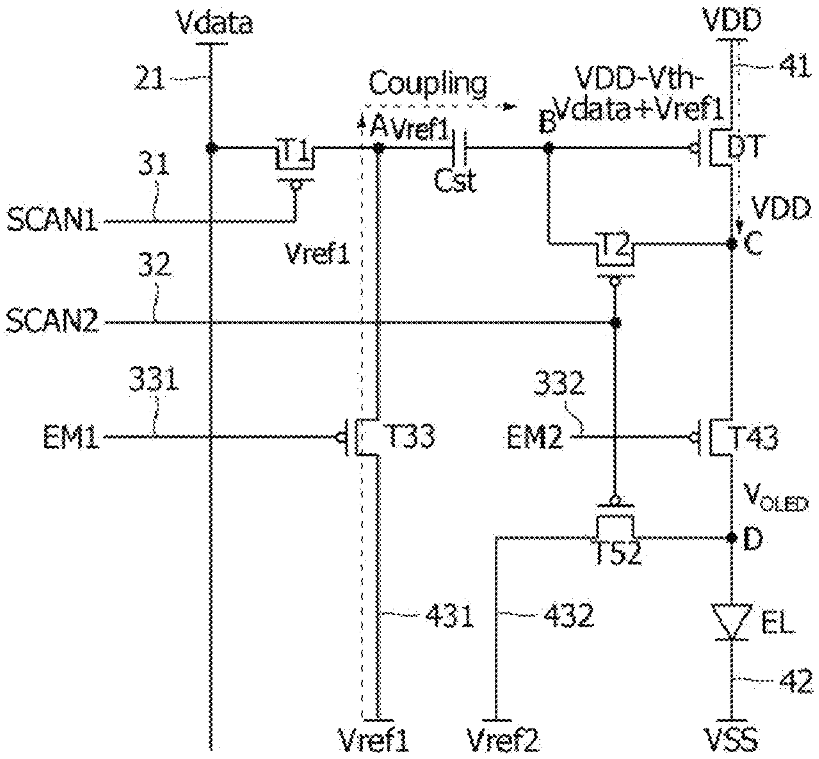
FIGS. 18A and 18B are diagrams illustrating a fourth step of the pixel circuit according to the fourth embodiment of the present disclosure.
Figure 18B:
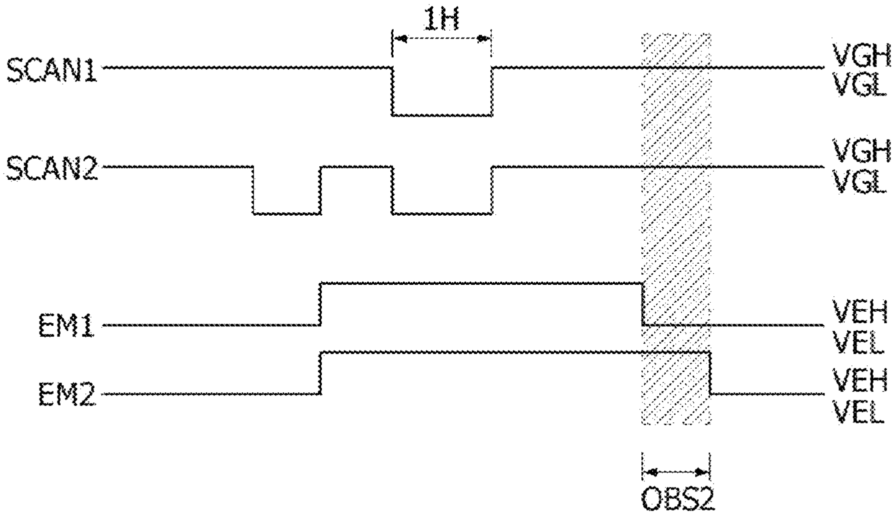

FIGS. 18A and 18B are diagrams illustrating a fourth step OBS2 of the pixel circuit according to the fourth embodiment of the present disclosure. FIG. 18A is a circuit diagram illustrating a flow of current in the pixel circuit and voltages of major nodes in the fourth step OBS2. FIG. 18B is a waveform diagram of a gate signal supplied to the pixel circuit in the fourth step OBS2.

Referring to FIGS. 18A and 18B, in the fourth step OBS2, a drain-source channel of the driving element DT is formed by applying the pixel driving voltage VDD to the first and second electrodes of the driving element DT while transmitting the data voltage Vdata to the second node B by applying the first reference voltage Vref1 to the first node A.

In the fourth step OBS2, the first EM pulse EM1 is inverted to the gate-on voltage VEL. In this case, voltages of the gate lines 31, 32, and 332 to which the scan pulses SCAN1 and SCAN2 and the second EM pulse EM2 are applied are gate-off voltages VGH and VEH. Therefore, in the fourth step OBS2, the third switch element T33 and the driving element DT are turned on and the first, second, fourth and fifth switch elements T1, T2, T43 and T52 are turned off.

In the fourth step OBS2, a voltage of the first node A is the reference voltage Vref and a voltage of the second node B is VDD−Vth−Vdata+Vref1. In this case, a voltage of the third node C is the pixel driving voltage VDD.

In the fourth step OBS2, a voltage higher than the pixel driving voltage VDD may be applied to the first and second electrodes of the driving element VDD.

Figure 19A:
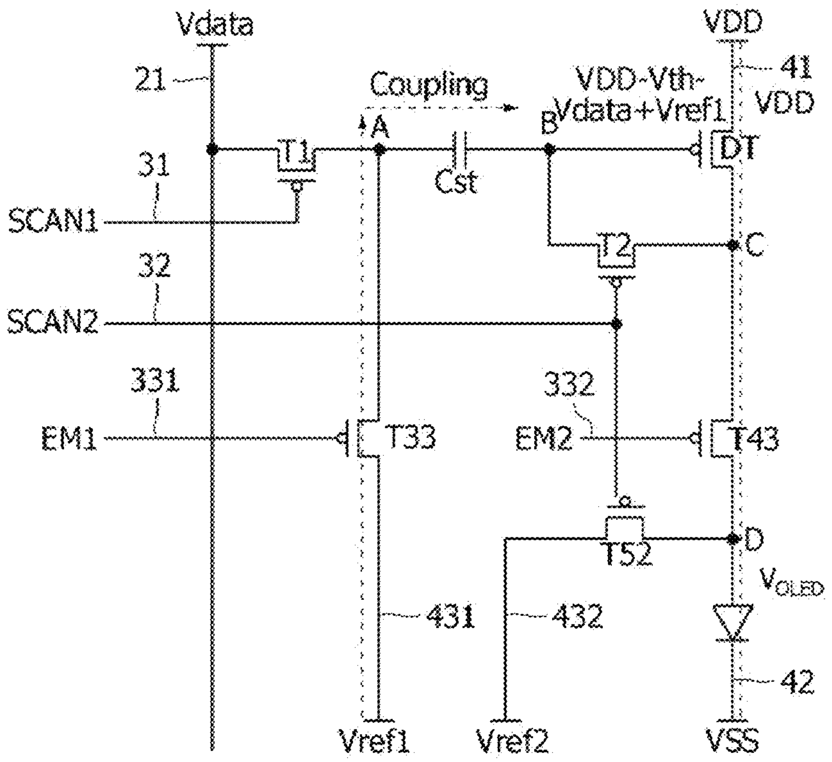
FIGS. 19A and 19B are diagrams illustrating a fifth step of the pixel circuit according to the fourth embodiment of the present disclosure.
Figure 19B:
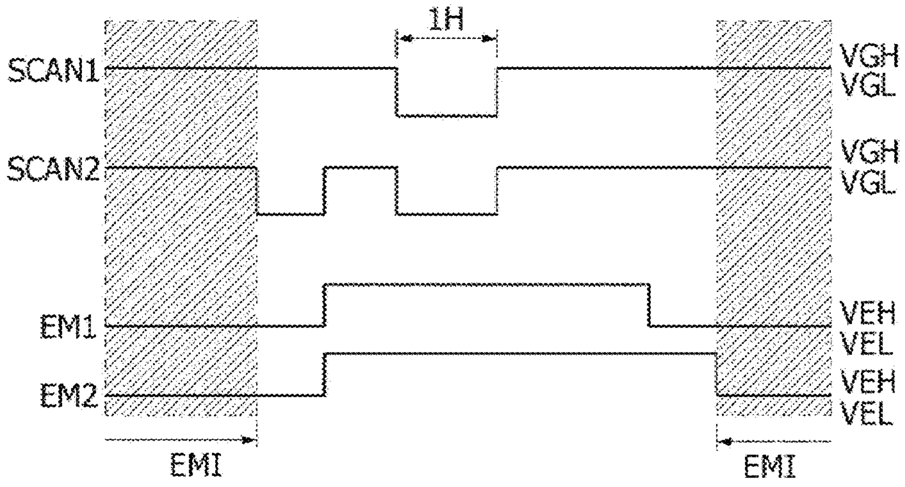

FIGS. 19A and 19B are diagrams illustrating a fifth step EMI of the pixel circuit according to the fourth embodiment of the present disclosure. FIG. 19A is a circuit diagram illustrating a flow of current in the pixel circuit and voltages of major nodes in the fifth step EMI. FIG. 19B is a waveform diagram of a gate signal supplied to the pixel circuit in the fifth step EMI.

Referring to FIGS. 19A and 19B, in the fifth step EMI, the second EM pulse EM2 is inverted to the gate-on voltage VEL. In the fifth step EMI, voltages of the gate lines 31 and 32 to which the scan pulses SCAN1 and SCAN2 are applied are the gate-off voltage VGH, and voltages of the gate lines 331 and 332 to which the EM pulses EM1 and EM2 are applied are the gate-on voltage VEL. Therefore, in the fifth step EMI, the first, second, and fifth switch elements T1, T2, and T52 are turned off but the third and fourth switch elements T33 and T43 are turned on.

In the fifth step EMI, the reference voltage Vref is applied to the first node A to transmit the data voltage Vdata to the second node B. In this case, a voltage of the second node B is VDD−Vth−Vdata+Vref1, and a voltage of the fourth node D is an anode voltage $V_{OLED}$ of the light-emitting element EL. In the fifth step EMI, the light-emitting element EL may emit light according to a current from the driving element DT.

The second step OBS of the pixel circuit will be described in detail with reference to FIGS. 20 to 24 below.

Figure 20:
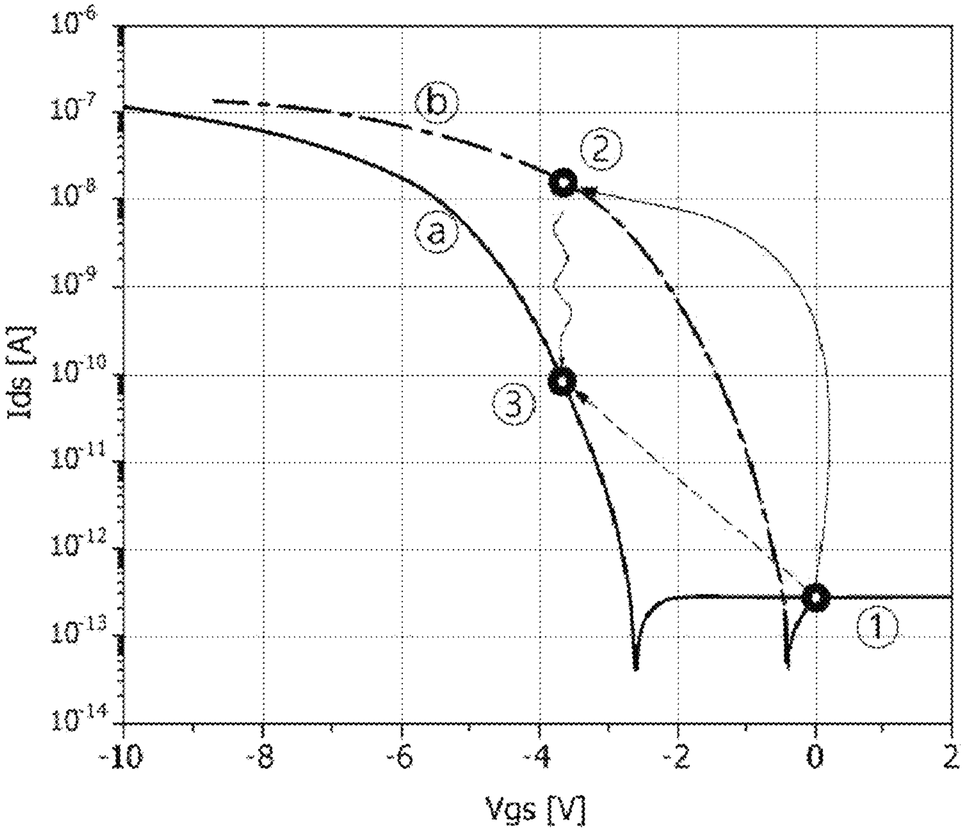
FIG. 20 is a diagram illustrating an equilibrium-state transfer curve and a non-equilibrium-state transfer curve of a driving element.
Figure 21:
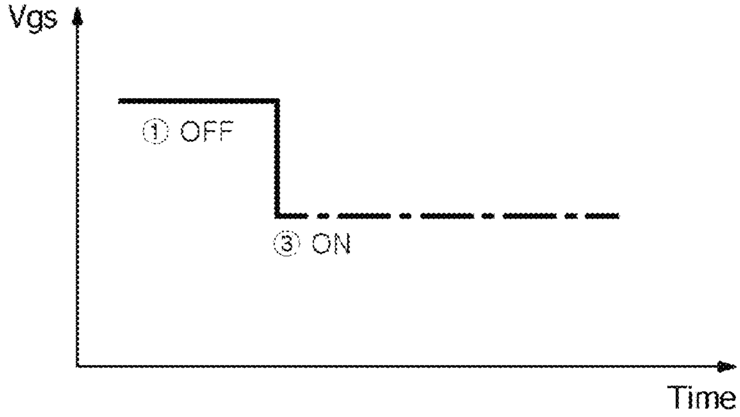
Figure 22:
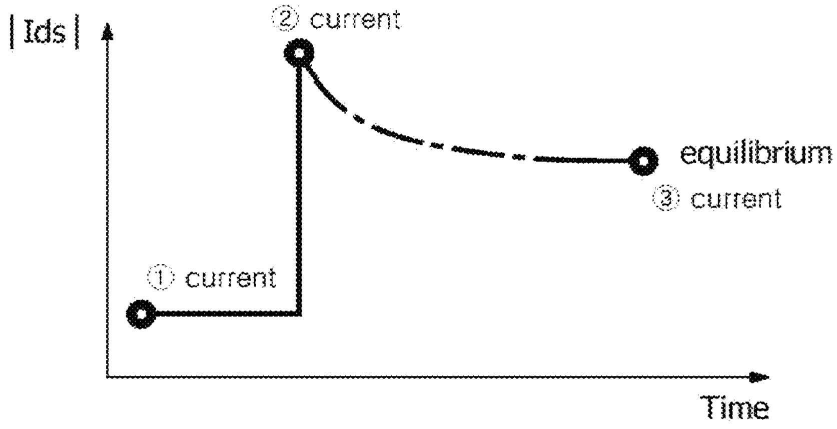
Figure 23:
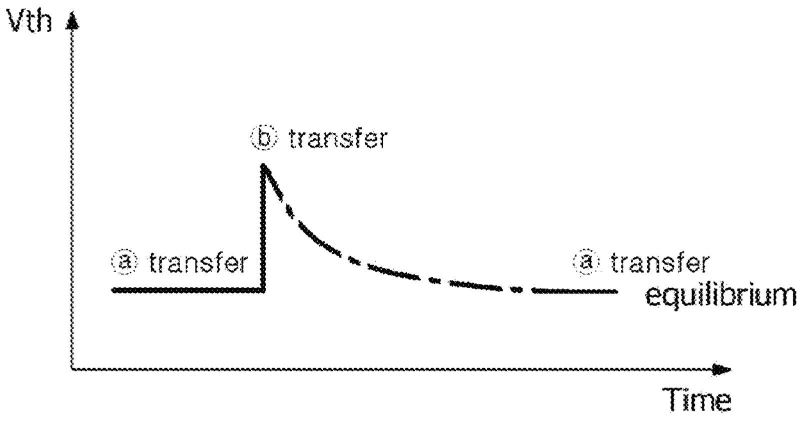
FIG. 23 is a diagram illustrating a threshold voltage of a driving element when the driving element changes from the equilibrium state to the non-equilibrium state and finally to the equilibrium state.

FIG. 20 illustrates an equilibrium transfer curve ⓐ and a non-equilibrium transfer curve ⓑ of a driving element DT. In FIG. 20, a horizontal axis represents a gate-source voltage Vgs of the driving element DT and a vertical axis represents a drain-source current Ids of the driving element DT. FIG. 21 illustrates a gate-source voltage Vgs when a driving element DT that is in an off state is turned on. FIG. 22 is a diagram illustrating an absolute value |Ids| of a drain-source current during changing of a driving element DT from an equilibrium state to a non-equilibrium state and finally to the equilibrium state, when the driving element DT that is in an off state is turned on. FIG. 23 is a diagram illustrating a threshold voltage Vth of a driving element DT when the driving element DT changes from the equilibrium state to the non-equilibrium state and finally to the equilibrium state.

Referring to FIGS. 20 to 24, the driving element DT generates a current Ids of a non-equilibrium transfer curve ⓑ from a current Ids of an equilibrium transfer curve ⓐ when the driving element DT that is in an off state is turned on, e.g., when the driving element DT is turned on at a first frame at which reproduction of an input image starts immediately after a display device is powered on. At the non-equilibrium transfer curve ⓐ, the driving element DT returns back to an equilibrium state ③ as electrons (e−) and holes (h+) each having a unique time constant are trapped or de-trapped at a trap site.

At the first frame at which the reproduction of the input image begins immediately after the display device is powered on, pixel data may change from black grayscale to white grayscale. In this case, the inversion of a gate-source voltage Vgs of the driving element DT may occur, and a threshold voltage Vth may change to a very large extent due to hysteresis characteristics of the driving element DT because the inversion of the gate-source voltage Vgs occurs in a non-equilibrium state. When the threshold voltage Vth changes to a large extent, a threshold voltage Vth of the driving element DT may change under the influence of a data voltage Vdata at a first frame. When grayscale of pixel data changes from black grayscale to white grayscale and thereafter white grayscale is maintained at subsequent consecutive frames, a rate of change ΔVgs of the gate-source voltage Vgs of the driving element DT may be different for each frame and may be very low at a frame after a certain time as compared to a first frame at which black grayscale changes to white grayscale. Due to a different rate of change ΔVth of the threshold voltage Vth of the driving element DT at the frame, e.g., a fourth frame, after the certain time as compared to the first frame, luminance of the first frame may be lower than that of the fourth frame, thus reducing a first frame response (FFR).

In the second step OBS, a negative (−) absolute value of the same gate-source voltage Vgs before sampling of the threshold voltage Vth of the driving element DT is increased. Therefore, the threshold voltage Vgs of the driving element DT may not be influenced by a data voltage Vdata set for a previous frame and a drain-source channel of the driving element DT may be formed by the same gate-source voltage Vgs when the second step OBS is performed for each frame. Thus, the difference between gate-source voltages ΔVgs of the driving element DT at the first frame and a frame after a certain time may decrease and thus a rate of change ΔVth of the threshold voltage Vth of the driving element DT decreases, thereby improving FFR characteristics.

Figure 24:
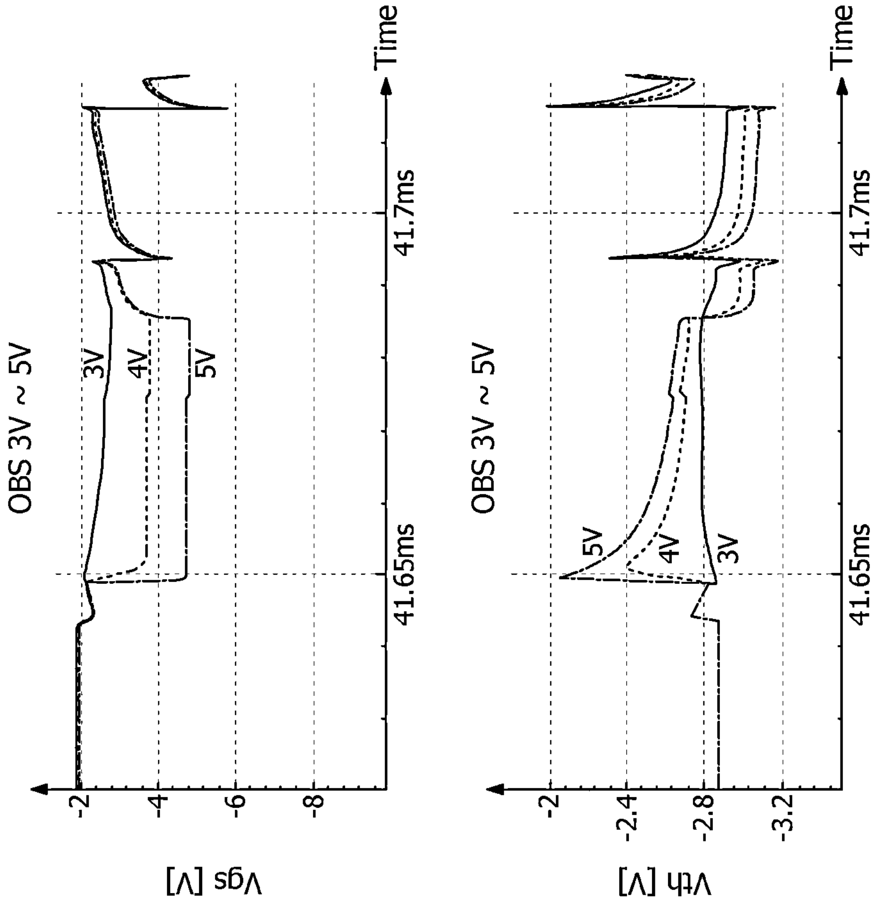
FIG. 24 is a diagram illustrating a change in a gate-source voltage and a threshold voltage of a driving element when a voltage of a third node is 3 V, 4 V, and 6 V in a second step of a pixel circuit.

In the second step OBS, as a voltage applied to the third node C increases, the threshold voltage Vth of the driving element DT may decrease when sampling of the driving element DT is completed. In the second step OBS, when a voltage of the third node C is higher than a certain voltage, the threshold voltage Vth of the driving element DT when the sampling of the driving element DT is completed may be equal to a threshold voltage Vth in an equilibrium state. FIG. 24 illustrates a result of a simulation showing a change of a gate-source voltage Vgs[V] and a threshold voltage Vth[V] of a driving element DT when a voltage of a third node C is 3 V, 4 V, and 6 V in the second step OBS.

Figure 25:
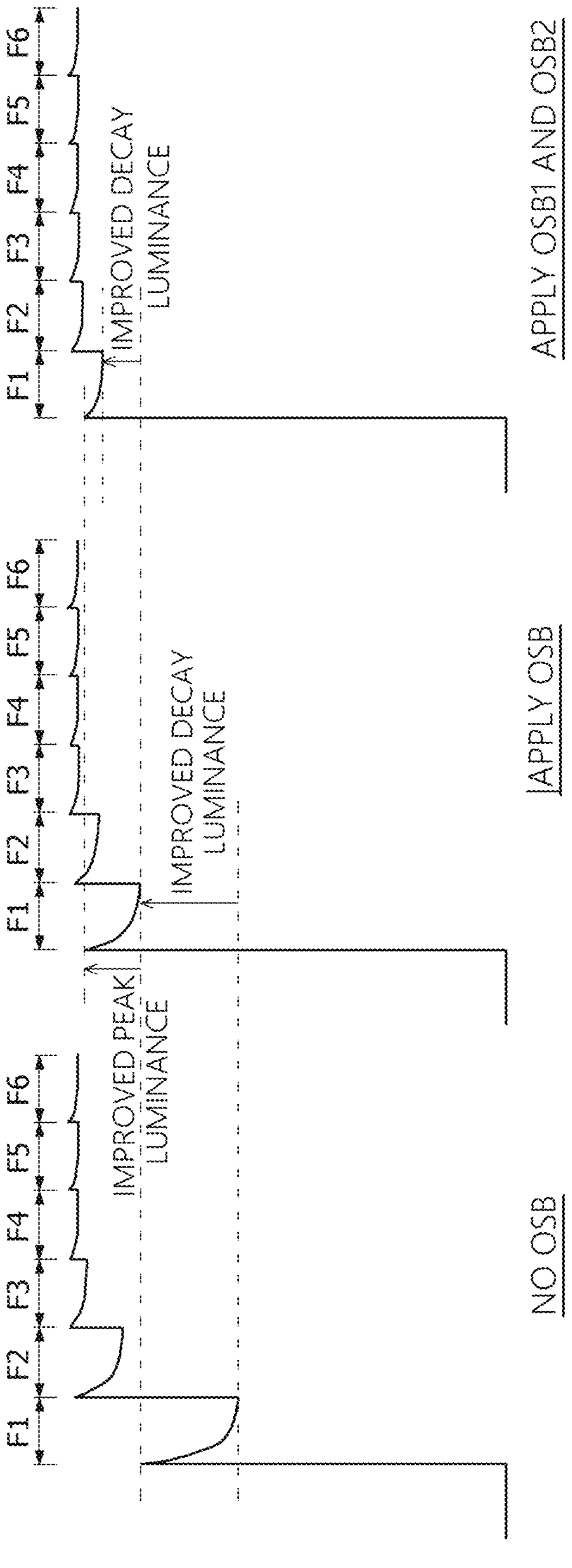
FIG. 25 is a diagram illustrating an effect of improvement of a first frame response (FFR) of the present disclosure.

FIG. 25 shows a comparison between effects of improvement of an FFR in embodiments of the present disclosure and a comparative example, when it is assumed that a data voltage set for a pixel circuit in a previous state of a first frame F1 is a black grayscale voltage and a voltage of pixel data written to the pixel circuit at the first frame F1 to a sixth frame F6 is a white grayscale voltage. In FIG. 25, a left drawing shows FFR characteristics of the comparative example in which the second step OBS in the first and second embodiments and the second and fourth steps OBS1 and OBS2 in the third and fourth embodiments are not included. In the second step OBS in the first and second embodiments or the second and fourth steps OBS1 and OBS2 in the third and fourth embodiments, the second and fourth switch elements T2 and T4 may be turned off and a voltage higher than or equal to the pixel driving voltage VDD may be applied to the third node C. In FIG. 25, a middle drawing shows improved FFR characteristics due to the second step OBS set in the first and second embodiments. In FIG. 25, a right drawing shows improved FFR characteristics due to the second and fourth steps OBS1 and OBS2 set in the third and fourth embodiments. As shown in FIG. 25, in the compensation steps OBS, OBS1, and OBS2 additionally set in the driving method of the pixel circuit of the present disclosure, FFR characteristics are improved by reducing the decay of luminance in a first frame FR1 when grayscale of pixel data changes sharply.

When a reference voltage Vref to be applied to the pixel circuit is lowered, as an initialization voltage of a second node B decreases, a gate-source voltage Vgs of a driving element DT increases and thus a threshold voltage Vth decreases, thereby improving FFR characteristics. However, when the reference voltage Vref is lowered, a voltage of the second node B is VDD−Vth−Vdata+Vref and thus luminance of black grayscale may increase. Thus, a change of luminance of a pixel is influenced by the reference voltage Vref applied to the first node A in the step EMI of driving an OLED. Considering an increase of luminance of black grayscale when the reference voltage Vref is lowered, a voltage higher than or equal to the pixel driving voltage VDD is applied to the third node C in the above-described embodiments.

In a fifth embodiment of the present disclosure, a voltage of a reference voltage Vref may be differently set in a first step INI in which pixels are initialized and an step EMI of driving an OLED to increase an effect of compensation steps OBS, OBS1 and OBS2 without causing a change in luminance of black grayscale. In the present embodiment, an effect of a compensation step may be increased without increasing the pixel driving voltage VDD to be higher than necessary, thereby reducing power consumption. In the present embodiment, the reference voltage Vref may be set as a low initialization voltage in the initialization step INI to increase an effect of the compensation steps OBS, OBS1, and OBS2, and may be set to be higher than the initialization voltage in the step EMI of driving a light-emitting element EL. The reference voltage Vref applied to the pixel circuit according to the fifth embodiment of the present disclosure is also applicable to all the embodiments described above. The fifth embodiment of the present disclosure will now be described with respect to the examples applied to the pixel circuit of the first embodiment, but is not limited by this.

A driving method of the pixel circuit according to the fifth embodiment of the present disclosure will be described in detail with FIGS. 26A to 30 below. The pixel circuit may be driven by a first step (or an initialization step) INT, a second step (or a compensation step) OBS, a third step (or a sampling step) SAM, and a fourth step (an step of driving a light-emitting element) EMI. Components of the pixel circuit that are substantially the same as those of the first embodiment are assigned the same reference numerals and detailed description thereof is omitted here.

Figure 26A:
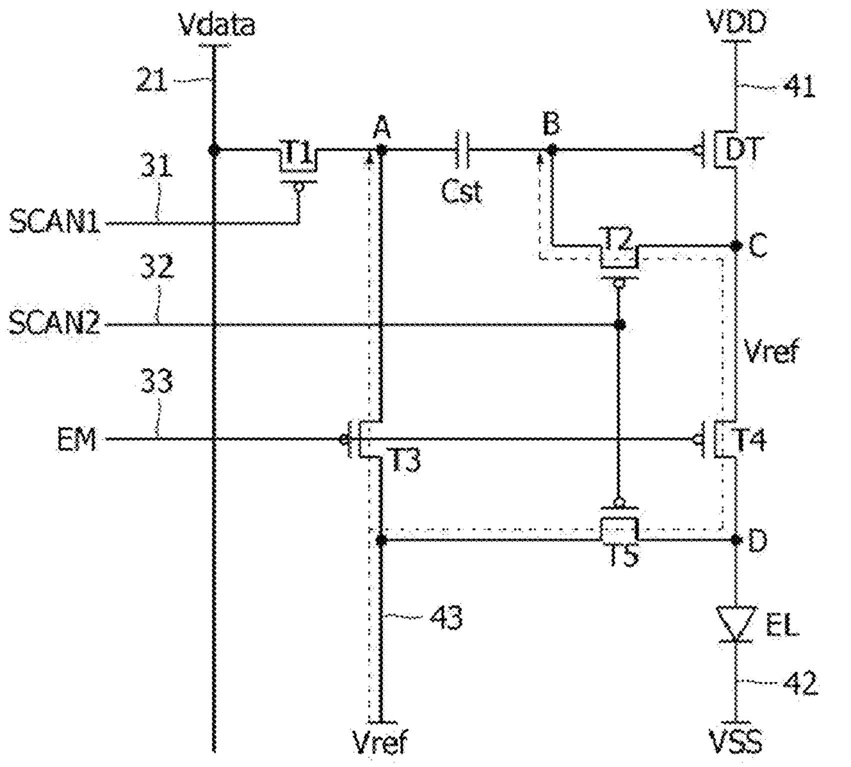
FIGS. 26A and 26B are diagrams illustrating a first step of a pixel circuit according to a fifth embodiment of the present disclosure.
Figure 26B:
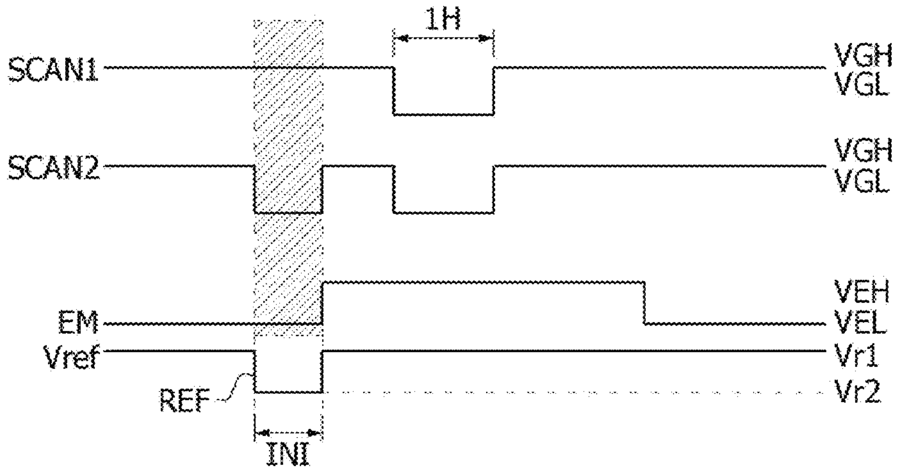

FIGS. 26A and 26B are diagrams illustrating the first step INI of the pixel circuit according to the fifth embodiment of the present disclosure. FIG. 26A is a circuit diagram illustrating a flow of current in the pixel circuit and voltages of major nodes in the first step INI. FIG. 26B is a waveform diagram of a gate signal supplied to the pixel circuit in the first step INI. In the present embodiment, a reference voltage Vref is applied to a third switch element T3 through a single Vref line 43. The reference voltage Vref includes pulses (hereinafter referred to as "reference voltage pulses") swinging between a second voltage Vr2 set as an initialization voltage in the first step INI and a first voltage Vr1 set in the second through fourth steps OBS, SAM and EMI.

Referring to FIGS. 26A and 26B, a second scan pulse SCAN2 of a gate-on voltage VGL is applied to a second gate line 32 in the first step INI. In this case, a voltage of the first gate line 31 is a gate-off voltage VGH and a voltage of a third gate line 33 is a gate-on voltage VEL. In the first step INI, a reference voltage pulse REF of the second voltage Vr2 is generated. In the first step INI, second to fifth switch elements T2 to T5 are turned on to initialize major nodes A to D and a capacitor Cst.

In the first step INI, the first to fourth nodes A to D are initialized to the second voltage Vr2 of the reference voltage pulses REF. In the first step INI, a driving element DT is turned on and a light-emitting element EL is turned off.

Figure 27A:
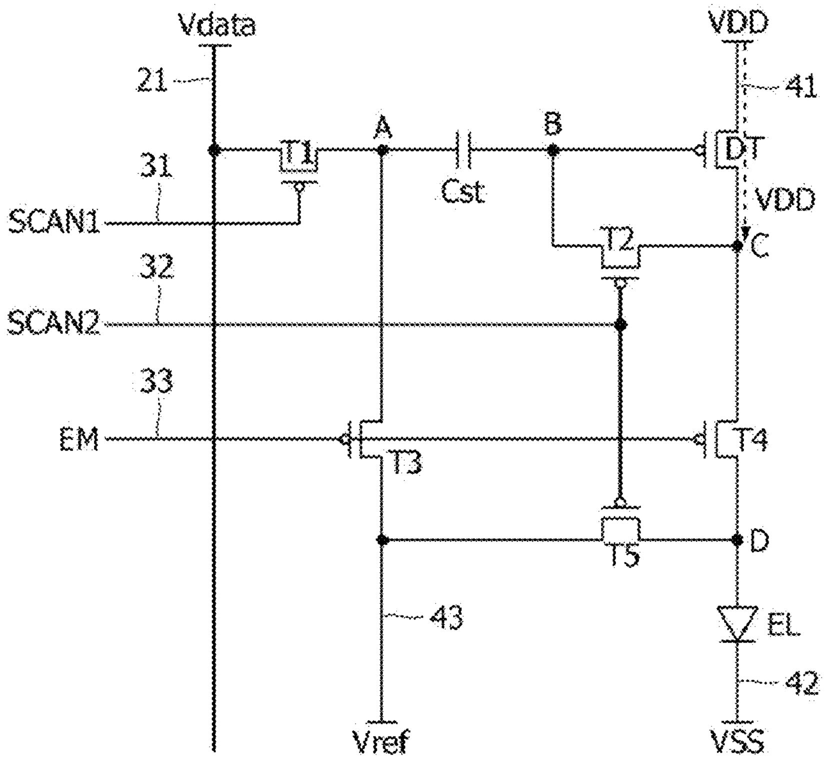
FIGS. 27A and 27B are diagrams illustrating a second step of the pixel circuit according to the fifth embodiment of the present disclosure.
Figure 27B:
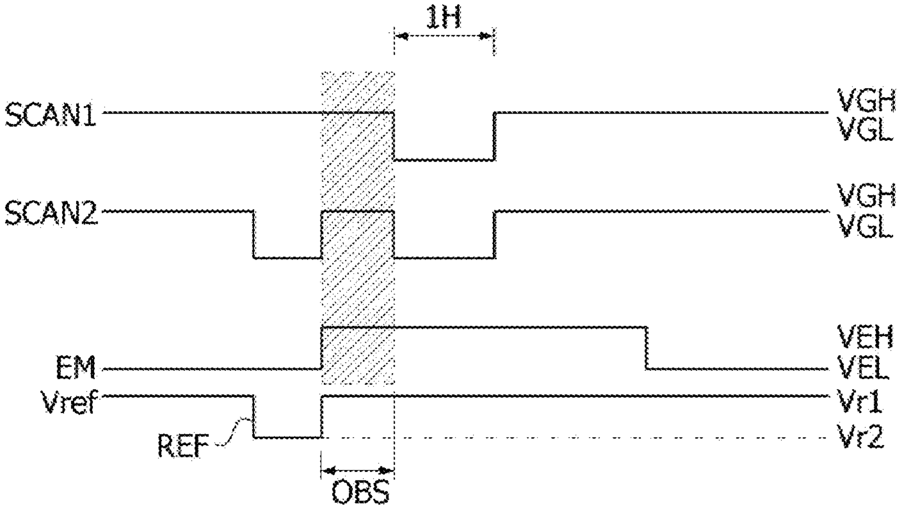

FIGS. 27A and 27B are diagrams illustrating the second step OBS of the pixel circuit according to the fifth embodiment of the present disclosure. FIG. 27A is a circuit diagram illustrating a flow of current in the pixel circuit and voltages of major nodes in the second step OBS. FIG. 27B is a waveform diagram of a gate signal supplied to the pixel circuit in the second step OBS.

Referring to FIGS. 27A and 27B, in the second step OBS, the second scan pulse SCAN2 is inverted to a gate-off voltage VGH and an EM pulse of the gate-off voltage VEH is generated. In this case, voltages of the first to third gate lines 31, 32, and 33 are gate-off voltages VGH and VEH. Thus, in the second step OBS, the first to fifth switch elements T1 to T5 are turned off and the driving element DT is maintained in an on state.

The driving element DT is turned on in the first step INI and is maintained in the on state in the second step OBS. Therefore, in the second step OBS, a voltage of the third node C changes to a pixel driving voltage VDD and thus the driving element DT is driven by a gate-source voltage Vgs, a negative absolute value of which increases, thereby reducing the threshold voltage Vth.

In the second step OBS, a voltage higher than the pixel driving voltage VDD may be applied to the first and second electrodes of the driving element VDD.

Figure 28A:
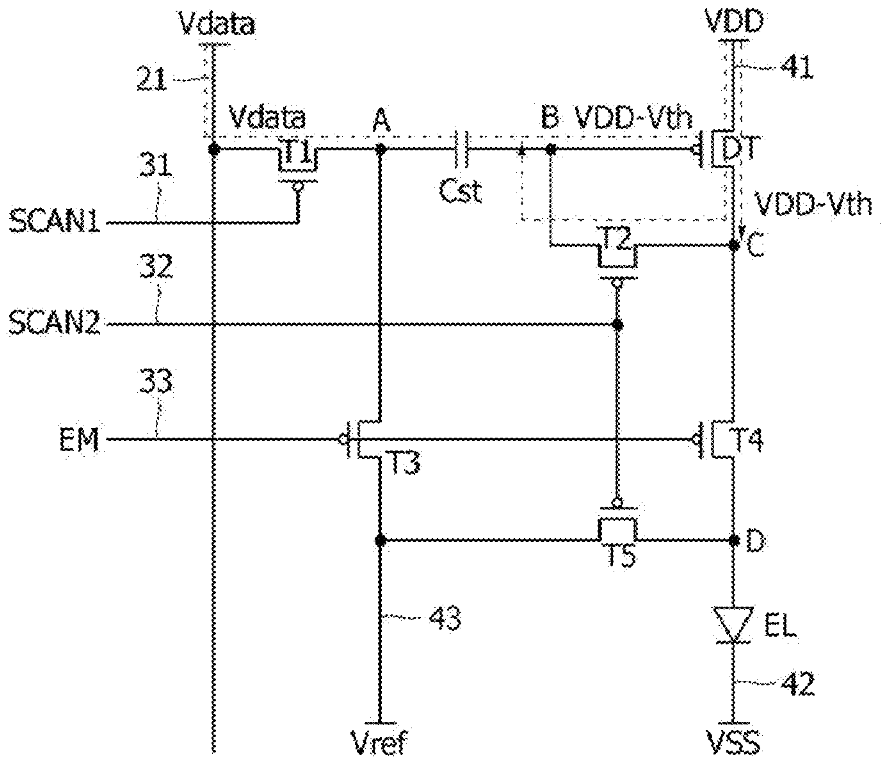
FIGS. 28A and 28B are diagrams illustrating a third step of the pixel circuit according to the fifth embodiment of the present disclosure.
Figure 28B:
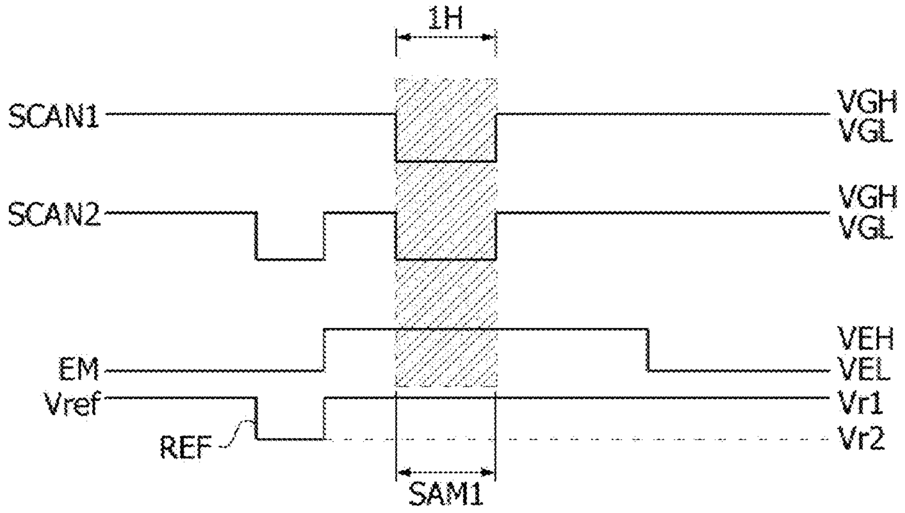

FIGS. 28A and 28B are diagrams illustrating the third step SAM of the pixel circuit according to the fifth embodiment of the present disclosure. FIG. 28A is a circuit diagram illustrating a flow of current in the pixel circuit and voltages of major nodes in the third step SAM. FIG. 28B is a waveform diagram of a gate signal supplied to the pixel circuit in the third step SAM.

Referring to FIGS. 28A and 28B, in the third step SAM, the first and second scan pulses SCAN1 and SCAN2 to be synchronized with data voltage Vdata of pixel data are generated to have the gate-on voltage VGL. In this case, the EM pulse EM is maintained at the gate-off voltage VEH. Therefore, in the third step SAM, the first, second, and fifth switch elements T1, T2, and T5 are turned on but the third and fourth switch elements T3 and T4 are in an off state.

In the third step SAM, the data voltage Vdata of the pixel data is applied to the first node A, and a voltage of the second node B changes to VDD−Vth. In the third step SAM, a voltage of the third node C changes from VDD to VDD−Vth.

A hold period HOLD may be set between the third step SAM and the fourth step EMI. During the hold period HOLD, the scan signals SCAN1 and SCAN2 are inverted to the gate-off voltage VGH.

Figure 29A:
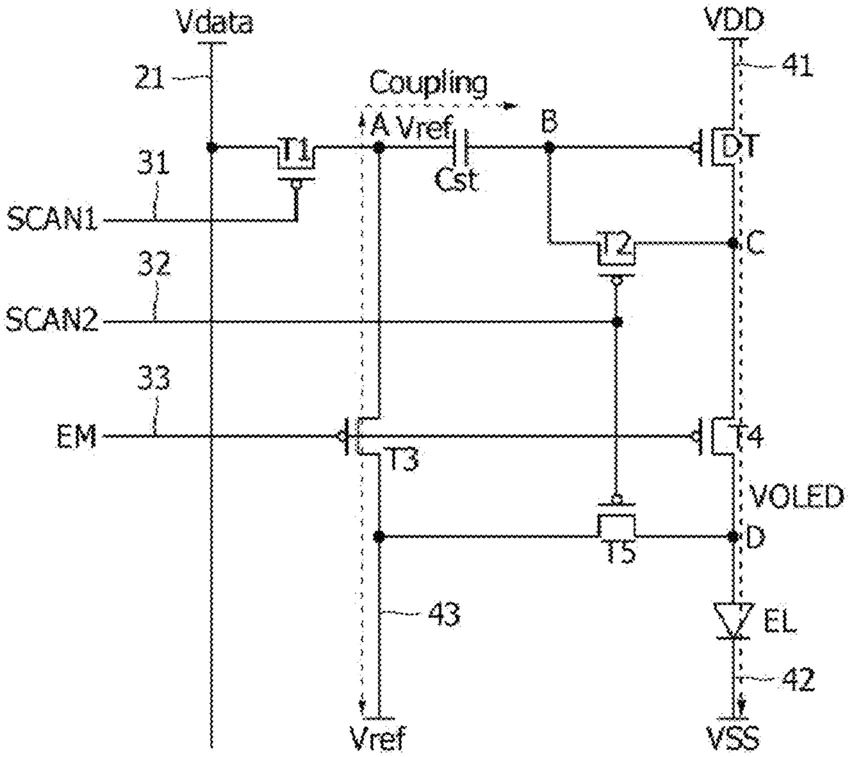
FIGS. 29A and 29B are diagrams illustrating a fourth step of the pixel circuit according to the fifth embodiment of the present disclosure.
Figure 29B:
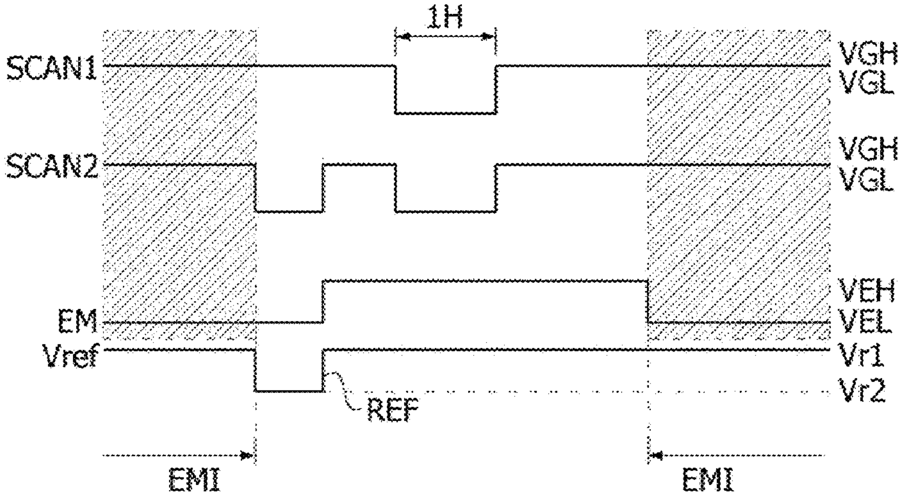

FIGS. 29A and 29B are diagrams illustrating the fourth step EMI of the pixel circuit according to the fifth embodiment of the present disclosure. FIG. 29A is a circuit diagram illustrating a flow of current in the pixel circuit and voltages of major nodes in the fourth step EMI. FIG. 29B is a waveform diagram of a gate signal supplied to the pixel circuit in the fourth step EMI.

Referring to FIGS. 29A and 29B, in the fourth step EMI, the EM pulse EM is inverted to the gate-on voltage VEL. In the fourth step EMI, voltages of the first and second gate lines 31 and 32 are the gate-off voltage VGH, and a voltage of the third gate line 33 is the gate-on voltage VEL. Therefore, in the fourth step EMI, the first, second, and fifth switch elements T1, T2, and T5 are turned off but the third and fourth switch elements T3 and T4 are turned on.

In the fourth step EMI, the first voltage Vr1 is applied to the first node A to transmit the data voltage Vdata to the second node B through capacitor coupling. In this case, a voltage of the second node B changes to VDD−Vth−Vdata+Vr1, and a voltage of the fourth node D is an anode voltage $V_{OLED}$ of the light-emitting element EL determined by a channel current of the driving element DT. In the fourth step EMI, the light-emitting element EL may emit light according to a current from the driving element DT.

Figure 30:
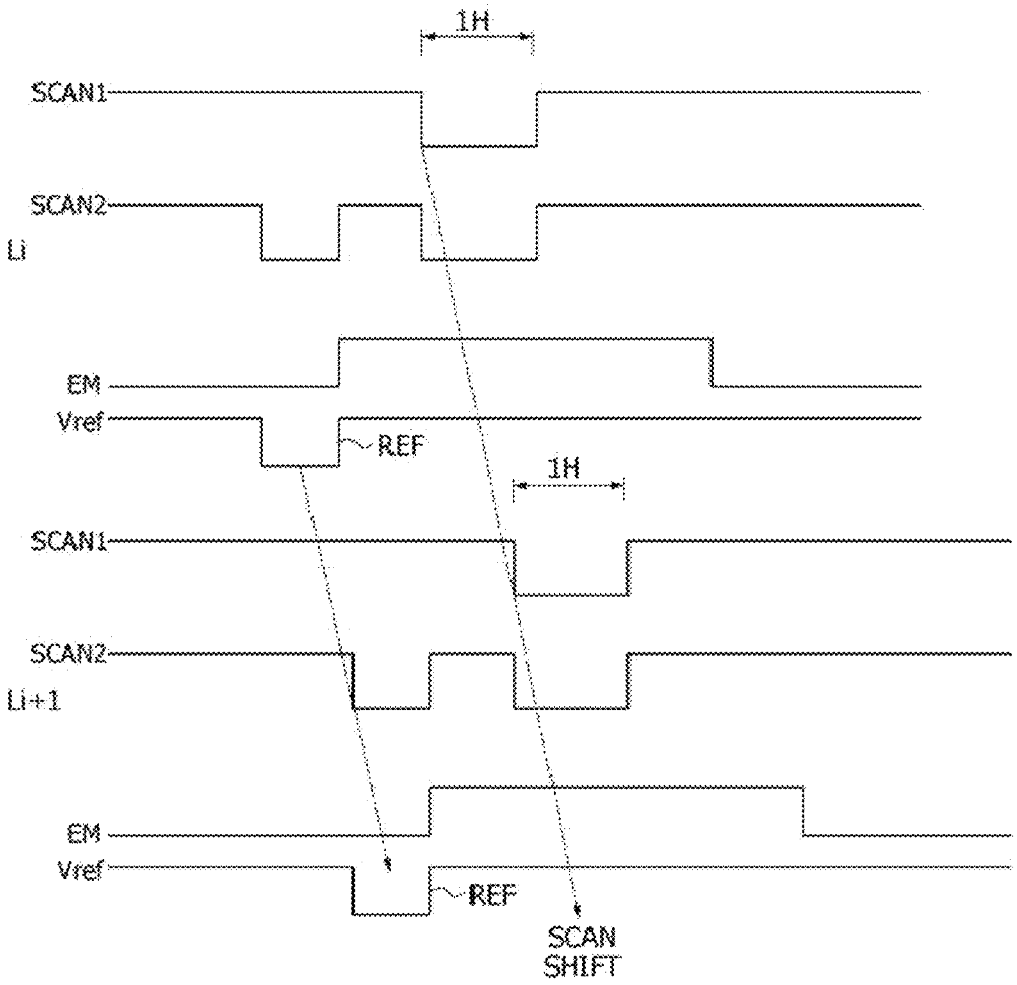
FIG. 30 is a waveform diagram illustrating a shift of a reference voltage pulse applied to the pixel circuit according to the fifth embodiment of the present disclosure.

Pixels of a display panel are sequentially scanned in units of pixel lines by sequentially shifting the gate signals SCAN1, SCAN2, and EM through a shift register, thereby charging a data voltage of pixel data. Thus, as shown in FIG. 30, the reference voltage pulses REF may be shifted in a direction SCAN SHIFT of scanning the pixels. In FIG. 30, "Li" denotes an $i^{th}$ pixel line (i is a natural number) of the display panel, and "Li+1" denotes an $(i+1)^{th}$ pixel line of the display panel.

Figure 31:
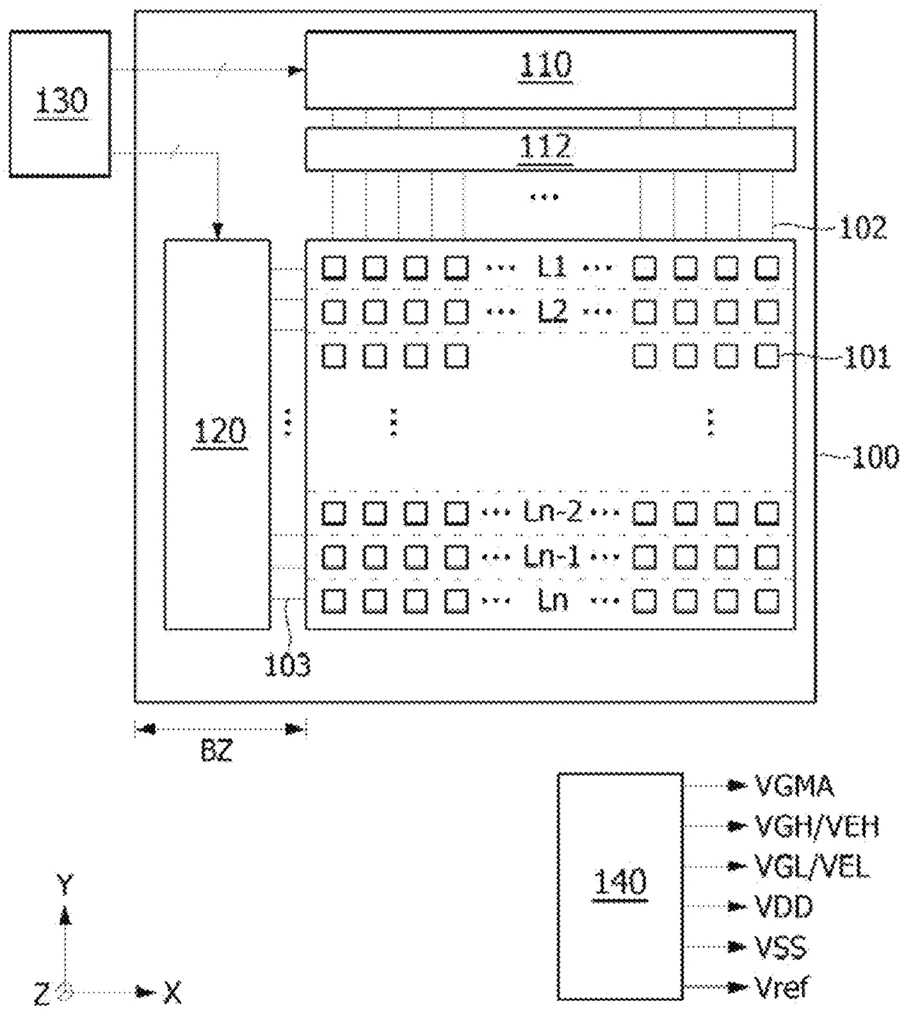
FIG. 31 is a block diagram of a display device according to an embodiment of the present disclosure.
Figure 32:
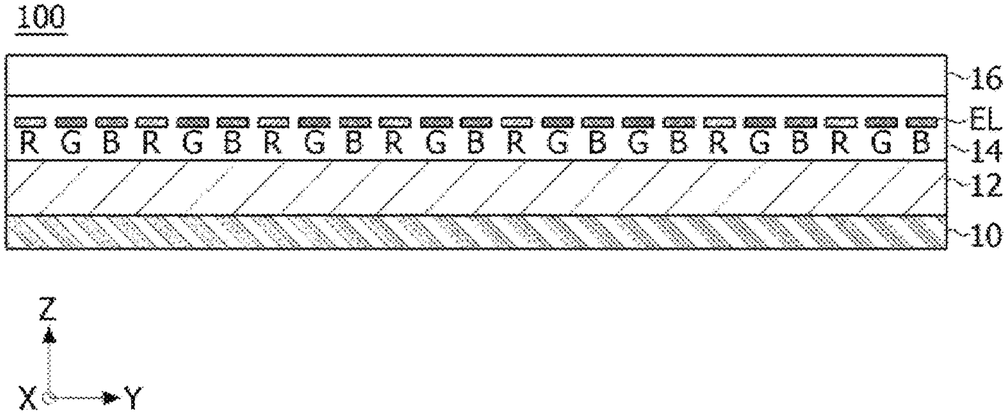
FIG. 32 is a cross-sectional view of a display panel of FIG. 31.

FIG. 31 is a block diagram of a display device according to an embodiment of the present disclosure. FIG. 32 is a cross-sectional view of a display panel of FIG. 31.

Referring to FIGS. 31 and 32, the display device according to an embodiment of the present disclosure includes a display panel 100, a display panel driver for writing pixel data to pixels of the display panel 100, and a power supply 140 for generating power necessary to drive the pixels and the display panel driver.

The display panel 100 may have a rectangular structure having a length in an X-axis direction, a width of a Y-axis direction and a thickness in a Z-axis direction. The display panel 100 includes a pixel array that displays an input image on a screen. The pixel array includes a plurality of data lines 102, a plurality of gate lines 103 crossing the plurality of data lines 102, and pixels arranged in a matrix. The display panel 100 may further include power lines commonly connected to the pixels. The power lines include a VDD line 41 to which a pixel driving voltage VDD is applied, a Vref line 43 to which a reference voltage Vref is applied, a VSS line 42 to which a low-potential power supply voltage VSS is applied, and the like. The power lines are commonly connected to pixels.

The pixel array includes a plurality of pixel lines L1 to Ln. Each of the pixel lines L1 to Ln includes pixels arranged in a first line on the pixel array of the display panel 100 in a direction of lines (X-axis direction). Pixels arranged in a first pixel line share the gate lines 103. Subpixels arranged in a column direction Y and a data-line direction share the same data line 102. One horizontal period 1H is a time calculated by dividing a one-frame period by the total number of the pixel lines L1 to Ln.

The display panel 100 may be embodied as a non-transmissive display panel or a transmissive display panel. A transmissive display panel is applicable to a transparent display device in which an image is displayed on a screen and through which a real object outside the transmissive display panel is visible.

The display panel 100 may be manufactured as a flexible display panel. The flexible display panel may be embodied as an OLED panel using a plastic substrate. In the flexible display panel, a circuit layer 12, a light-emitting element layer 14, and an encapsulation layer 16 may be disposed on an organic thin film adhered onto a flexible back plate.

Each pixel 101 may include a red sub-pixel, a green sub-pixel, and a blue sub-pixel to realize colors. Each of the pixels 101 may further include a white sub-pixel. Each subpixel includes a pixel circuit of each of the embodiments described above. Hereinafter, a pixel may be understood as having the same meaning as a subpixel. Each pixel circuit is connected to the data line 102, the gate lines 103, and the power lines 41, 42, and 43.

Pixels may be arranged in the form of real-color pixels and pentile pixels. In the case of a pentile pixel, two subpixels of different colors are driven as one pixel 101 using a predetermined pixel rendering algorithm to realize a resolution higher than a resolution of a real-color pixel. The pixel rendering algorithm may compensate for insufficient color representation of each pixel using colors of light emitted from adjacent pixels.

Touch sensors may be disposed on the screen of the display panel 100. The touch sensors include on-cell type or add-on type touch sensors disposed on the screen of the display panel 100 or in-cell type touch sensors included in a pixel array AA.

When a cross-sectional structure of the display panel 100 is viewed, the display panel may include the circuit layer 12, the light-emitting element layer 14, and the encapsulation layer 16 that are stacked on a substrate 10 as shown in FIG. 32.

The circuit layer 12 may include a pixel circuit connected to interconnections such as a data line, a gate line, and a power line, a gate driver (GIP) connected to gate lines, a de-multiplexer array 112, a circuit (not shown) for auto probe inspection, etc. An interconnection and circuit elements of the circuit layer 12 may include a plurality of insulating layers, two or more metal layers separated from each other with the insulating layers therebetween, and an active layer including a semiconductor material.

The light-emitting element layer 14 may include light-emitting elements EL to be driven by the pixel circuit. The light-emitting elements EL may include a red (R) light-emitting element, a green (G) light-emitting element, and a blue (B) light-emitting element. The light-emitting element layer 14 may include a white light-emitting element and a color filter. The light-emitting elements EL of the light-emitting element layer 14 may be covered with a protective layer.

The encapsulation layer 16 covers the light-emitting element layer 14 to seal the circuit layer 12 and the light-emitting element layer 14. The encapsulation layer 16 may be a multi-insulating film structure in which an organic film and an inorganic film are alternately stacked. The inorganic film blocks infiltration of moisture or oxygen. The organic film planarizes a surface of the inorganic film. When the organic film and the inorganic film are stacked in multiple layers, a moving path of moisture or oxygen is longer than that of a single layer and thus the infiltration of moisture and oxygen that may influence the light-emitting element layer 14 may be effectively blocked.

A touch sensor layer may be disposed on the encapsulation layer 16. The touch sensor layer may include capacitance touch sensors that sense a touch input on the basis of a change in capacitance before and after the touch input is input. The touch sensor layer may include metal interconnection patterns and insulating films that form a capacitance of touch sensors. A capacitance of a touch sensor may be formed between metal interconnection patterns. A polarizing plate may be disposed on the touch sensor layer. The polarizing plate may convert polarization of external light reflected from the metals of the touch sensor layer and the circuit layer 12 to improve visibility and a contrast ratio. The polarizing plate may be embodied as a polarizing plate or circular polarizing plate in which a linear polarizing plate and a phase-delay film are bonded with each other. Cover glass may be glued onto the polarizing plate.

The display panel 100 may further include a touch sensor layer and a color filter layer stacked on the encapsulation layer 16. The color filter layer may include red, green, and blue color filters and a black matrix pattern. The color filter layer may absorb a part of a wavelength of light reflected from the circuit layer and the touch sensor layer instead of the polarizing plate and increase color purity. In the present embodiment, the color filter layer having a higher transmittance than that of a polarizing plate is applied to the display panel 100 to improve light transmittance, improving a thickness and flexibility of the display panel 100. Cover glass may be glued onto the color filter layer.

The power supply 140 generates constant voltage (or direct-current (DC) voltage) power, which is necessary to drive the pixel array and the display panel driver of the display panel 100, using a DC-DC converter. The DC-DC converter may include a charge pump, a regulator, a buck converter, a boost converter, or the like. The power supply 140 may adjust a level of an input DC voltage applied from a host system (not shown) to generate a constant voltage such as a gamma reference voltage VGMA, gate-off voltages VGH and VEH, gate-on voltages VGL and VEL, a pixel driving voltage VDD, a low-potential power supply voltage VSS, or a reference voltage Vref. The gamma reference voltage VGMA is applied to a data driver 110. The gate-off voltages VGH and VEH and the gate-on voltages VGL and VEL are applied to a gate driver 120.

The display panel driver writes pixel data of an input image to the pixels of the display panel 100 under control of a timing controller TCON 130.

The display panel driver includes the data driver 110 and the gate driver 120. The display panel driver may further include the de-multiplexer array 112 between the data driver 110 and the data lines 102.

The de-multiplexer array 112 sequentially applies data voltages output from channels of the data driver 110 to the data lines 102 using a plurality of de-multiplexers (DEMUXs). The DEMUXs may include a number of switch elements on the display panel 100. When the DEMUXs are disposed between output terminals of the data driver 110 and the data lines 102, the number of channels of the data driver 110 may decrease. The de-multiplexer array 112 may be omitted.

The display panel driver may further include a touch sensor driver to drive the touch sensors. The touch sensor driver is omitted in FIG. 31. The data driver and the touch sensor driver may be integrated into one drive integrated circuit (IC). In a mobile device or wearable device, the timing controller 130, the power supply 140, the data driver 110, the touch sensor driver, etc. may be integrated into one drive IC.

The display panel driver may operate in a low-speed driving mode under control of the timing controller 130. The low-speed driving mode may be set to analyze an input image and reduce power consumption of a display device when there is no change in the input image for a predetermined time. In the low-speed driving mode, when still images are input for a certain time period or more, a refresh rate of pixels may be reduced to reduce power consumption of the display panel driver and the display panel 100. The low-speed driving mode is not limited to a case in which still images are input. For example, the display panel driving circuit may operate in the low-speed driving mode when the display device operates in a standby mode or when a user command or an input image is not input to the display panel driving circuit for a certain time.

The data driver 110 generates a data voltage by converting pixel data of an input image, which is received in the form of a digital signal from the timing controller 130 for each frame period, into a gamma compensation voltage using a digital-to-analog converter (DAC). The gamma reference voltage VGMA is applied to the DAC by being divided into a gamma compensation voltage for each grayscale through a voltage divider circuit. The data voltage is output from each channel of the data driver 110 through an output buffer.

The gate driver 120 may be embodied as a gate-in-panel (GIP) circuit directly formed on the circuit layer 12 of the display panel 100, together with a TFT array and interconnections of the pixel array. The GIP circuit may be disposed on a bezel area BZ that is a non-display area of the display panel 100 or may be distributively disposed in the pixel array on which an input image is reproduced. The gate driver 120 sequentially outputs a gate signal to the gate lines 103 under control of the timing controller 130. The gate driver 120 may sequentially supply gate signals SCAN1, SCAN2 and EM to the gate lines 103 by shifting the gate signals SCAN1, SCAN2 and EM using a shift register. Gate signals may include scan pulses SCAN1 and SCAN2, an EM pulse EM, a reference voltage pulse, etc.

Figure 33:
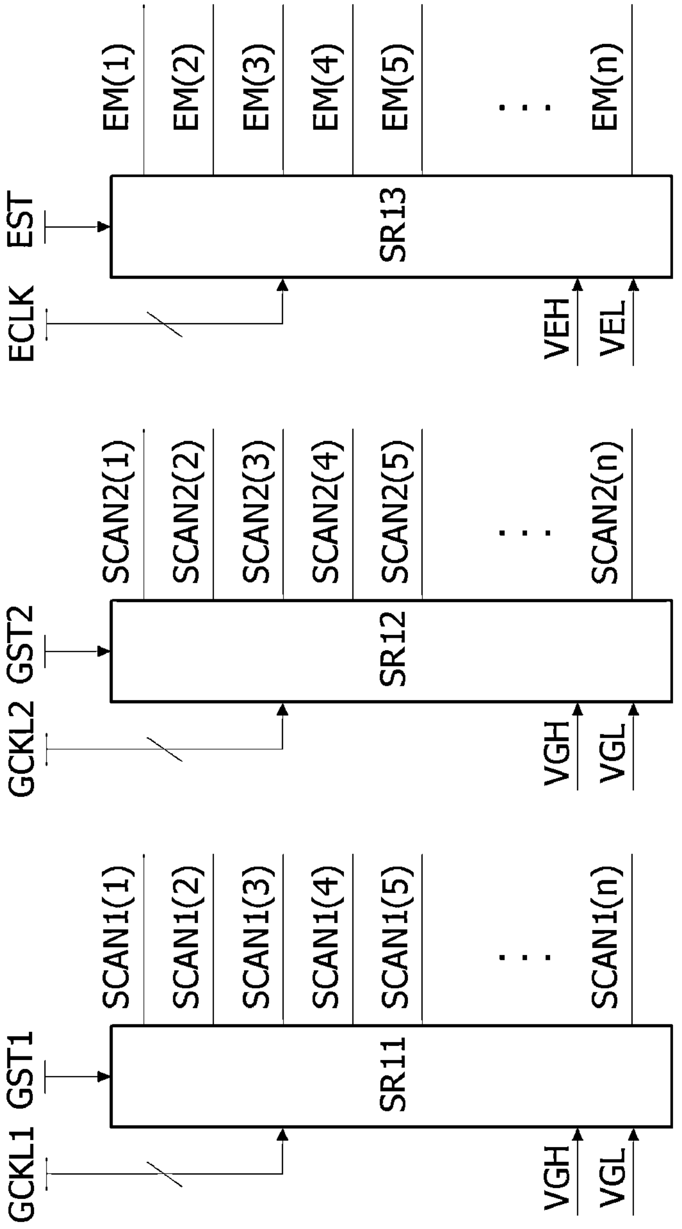
FIG. 33 is a circuit diagram illustrating a gate driver according to the first embodiment of the present disclosure.

The gate driver 120 may include a plurality of shift registers as shown in FIGS. 32 and 33. Each of the shift registers outputs a pulse of a gate signal in response to a start pulse and a shift clock from the timing controller 130, and shifts the pulse of the gate signal in synchronization with timing of the shift clock.

The timing controller 130 receives, from a host system, digital video data DATA of an input image and a timing signal that is in synchronization with the digital video data DATA. The timing signal may include a vertical synchronization signal Vsync, a horizontal synchronization signal Hsync, a clock CLK, a data enable signal DE, etc. A vertical period and a horizontal period may be identified by a method of counting the data enable signal DE and thus the vertical synchronization signal Vsync and the horizontal synchronization signal Hsync may be omitted. The data enable signal DE has a period of one horizontal period 1H.

The host system may be a television system, a tablet computer, a laptop computer, a navigation system, a personal computer (PC), a home theater system, a mobile device, a wearable device, or a vehicle system. The host system may scale an image signal from a video source to match a resolution of the display panel 100 and transmit a resultant image signal and a timing signal to the timing controller 130.

In a normal driving mode, the timing controller 130 may multiply an input frame frequency by i (i is a natural number) and control an operation timing of the display panel driver with a frame frequency, which is the input frame frequency Xi Hz. The input frame frequency is 60 Hz according to the National Television Standards Committee (NTSC) standard or is 50 Hz in the Phase-Alternating Line (PAL) standard. The timing controller 130 may reduce a driving frequency of the display panel driver by reducing a frame frequency to be between 1 Hz to 30 Hz and lower a refresh rate of the pixels in the low-speed driving mode.

The timing controller 130 may generate a data timing control signal for controlling an operation timing of the data driver 110, a control signal for controlling an operation timing of the de-multiplexer array 112, and a gate timing control signal for controlling an operation timing of the gate driver 120, based on timing signals Vsync, Hsync, and DE received from the host system. The gate timing control signal may include a start pulses and a shift clock. The timing controller 130 controls an operation timing of the display panel driver to synchronize the data driver 110, the de-multiplexer array 112, the touch sensor driver, and the gate driver 120 therewith.

The timing controller 130 may control the gate driver 120 to drive pixels according to output signals SCAN1, SCAN2, EM, and REF of the gate driver 120 for which the compensation steps OBS, OBS1, and OBS2 are set for each frame. In another embodiment, the timing controller 130 may control the gate driver 120 by determining whether the compensation steps OBS, OBS1, and OBS2 are set on the basis of a result of analyzing an input image. The gate driver 120 may output the output signals SCAN1, SCAN2, EM, and REF for which the compensation steps OBS, OBS1, and OBS2 are added only under a condition that these compensation steps are set under the control of the timing controller 130.

A voltage of a gate timing control signal output from the timing controller 130 may be applied to the gate driver 120 by being converted into gate-off voltages VGH and VEH and gate-on voltages VGL and VEL through a level shifter (not shown). The level shifter converts a low-level voltage of the gate timing control signal into the gate-on voltages VGL and VEL and a high-level voltage of the gate timing control signal into gate-off voltages VGH and VEH.

In another embodiment, the timing controller 130 may input a reference clock of a gate timing signal to the level shifter, and the level shifter may sample the reference clock from the timing controller 130 to generate a shift clock to be input to the shift registers of the gate driver 120.

FIG. 33 is a circuit diagram illustrating a gate driver 120 according to the first embodiment of the present disclosure.

Referring to FIG. 33, the gate driver 120 includes a first shift register SR11 that sequentially outputs first scan pulses SCAN1(1) to (n), a second shift register SR12 that sequentially outputs second scan pulses SCAN2(1) to (n), and a third shift register SR13 that sequentially outputs EM pulses EM(1) to (n).

SCAN1(*i*) is a first scan pulse SCAN1 applied to pixels in an $i^{th}$ pixel line. SCAN2(*i*) is a second scan pulse SCAN2 applied to the pixels in the $i^{th}$ pixel line. EM(i) is an EM pulse EM applied to the pixels in the $i^{th}$ pixel line. Gate-off voltages VGH and VEH and gate-on voltages VGL and VEL are applied to each of the shift registers SR11, SR12, and SR13.

In FIG. 33, "GST1, GST2, and EST" are start pulses input to the shift registers SR11, SR12, and SR13, respectively. "GCLK1, GCLK2, and ECLK" are shift clocks input to shift registers SR11, SR12, and SR13, respectively. Each of the shift clocks GCLK1, GCLK2, and ECLK may be j-phase clock (j is a natural number greater than or equal to 2).

The shift registers SR11, SR12, and SR13 may receive the start pulses GST1, GST2, and EST, output first gate signals SCAN1(1), SCAN2(1), and EM(1), and shift gate signals of a previous stage to a subsequent stage at rising or falling edges of the shift clocks GCLK1, GCLK2, and ECLK, respectively. To reduce a bezel area BZ, at least some of interconnections and circuit elements connected to the shift registers SR11, SR12, and SR13 may be distributively arranged in a pixel array.

The first and second shift registers SR11 and SR12 may be shared by a controller that commonly functions and be unified as one shift register by separating output buffers that output an output under control of the controller. An example of such a unified shift register is disclosed in Korean Laid-open Patent Publication No. 10-2021-0082904 (Jul. 6, 2021).

The gate driver 120 shown in FIG. 33 may sequentially output the gate signals SCAN1, SCAN2, and EM applied to the pixel circuits according to the first to fourth embodiments described above.

Figure 34:
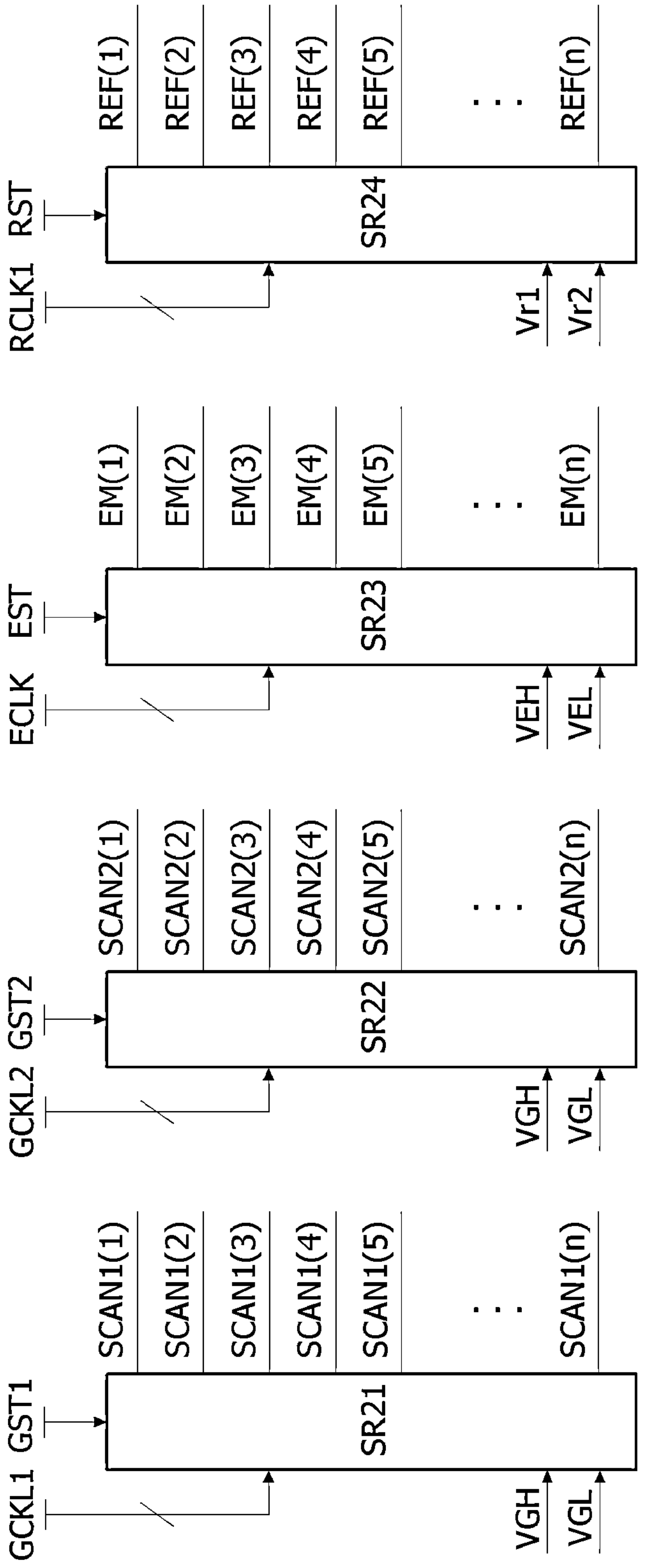
FIG. 34 is a circuit diagram illustrating a gate driver according to the second embodiment of the present disclosure.

FIG. 34 is a circuit diagram illustrating a gate driver 120 according to the second embodiment of the present disclosure.

Referring to FIG. 34, the gate driver 120 includes a first shift register SR21 that sequentially outputs first scan pulses SCAN1(1) to (n), a second shift register SR22 that sequentially outputs second scan pulses SCAN2(1) to (n), a third shift register SR23 that sequentially outputs EM pulses EM(1) to (n), and a fourth shift register SR24 that sequentially outputs reference voltage pulses REF(1) to (n).

SCAN1(*i*) is a first scan pulse SCAN1 applied to pixels in an $i^{th}$ pixel line. SCAN2(*i*) is a second scan pulse SCAN2 applied to the pixels in the $i^{th}$ pixel line. EM(i) is an EM pulse EM applied to the pixels in the $i^{th}$ pixel line. REF(i) is a reference voltage pulse REF applied to the pixels in the $i^{th}$ pixel line. Gate-off voltages VGH and VEH and gate-on voltages VGL and VEL are applied to each of the shift registers SR21, SR22, and SR23. A first voltage Vr1 and a second voltage Vr2 of a reference voltage Vref are applied to the fourth shift register SR24. In FIG. 34, "GST1, GST2, EST, and RST" are start pulses input to the shift registers SR21, SR22, SR23 and SR24, respectively. "GCLK1, GCLK2, ECLK, and RCLK" are shift clocks input to shift registers SR21, SR22, SR23, and SR24, respectively. Each of the shift clocks GCLK1, GCLK2, ECLK, and RCLK may be a j-phase clock.

The first to third shift registers SR21, SR22, and SR23 may receive the start pulses GST1, GST2, and EST, output first gate signals SCAN1(1), SCAN2(1), and EM(1), and shift gate signals to a subsequent stage at rising or falling edges of the shift clocks GCLK1, GCLK2, and ECLK, respectively. To reduce the bezel area BZ, at least some of interconnections and circuit elements connected to the shift registers SR21, SR22, SR23 and SR24 may be distributively arranged in the pixel array.

The first and second shift registers SR21 and SR22 may be unified as one shift register. The fourth shift register SR24 receives the start pulse RST, outputs a first reference voltage pulse REF(1), and shifts reference pulses output from a previous stage to a subsequent stage at rising or falling edges of the shift clocks GCLK1, GCLK2, and ECLK.

The gate driver 120 of FIG. 34 may output the gate signals SCAN1, SCAN2, and EM and the reference voltage pulse REF to be applied to the pixel circuit according to the fifth embodiment of the present disclosure.

As shown in FIGS. 35 to 39, in a display device of the present disclosure, the compensation steps OBS, OBS1 and OBS2 may be added only when a rate of change of grayscale of pixel data is large or when an image pattern is changed or a scene change occurs on the basis of a result of analyzing an input image. In the present embodiment, the timing controller 130 may enable setting of compensation steps only under conditions as described above according to a result of analyzing an input image to control the gate driver 120 to output the signals SCAN1, SCAN2, EM, and REF for which the compensation steps OBS, OBS1 and OBS2 are added.

Figure 35:
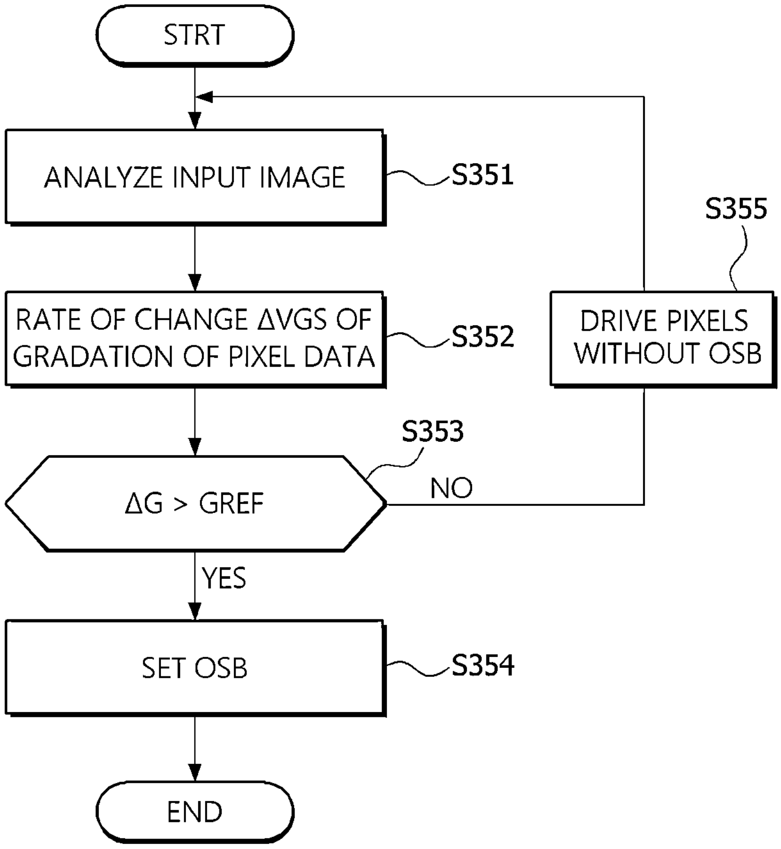
FIG. 35 is a flowchart of a method of selectively driving pixels according to the first embodiment of the present disclosure.

FIG. 35 is a flowchart of a method of selectively driving pixels according to the first embodiment of the present disclosure.

Referring to FIG. 35, in the method of selectively driving pixels, an input image is analyzed to identify a rate of change ΔG of grayscale of pixel data written to pixels (S351 and S352).

The rate of change ΔG of grayscale of the pixel data may be calculated in units of frames or lines. For example, the timing controller 130 may identify the rate of change ΔG in units of one frame by comparing the sums of grayscale values of pixel data of respective frames or averages of the grayscale values of the respective frames. The timing controller 130 may identify the rate of change ΔG in units of one frame by calculating an average picture level (APL) of each frame and comparing the APLs of the frames.

The timing controller 130 may identify the rate of change ΔG in units of one pixel line by comparing the sums of grayscale values of pixel data of respective frames or averages of the grayscale values of the respective frames.

In the method of selectively driving pixels, the rate of change ΔG of grayscale is compared with a predetermined reference value GREF, and when the rate of change ΔG of grayscale is greater than the reference value GREF, the pixels are driven by output signals of the gate driver 120 for which the compensation steps OBS, OBS1, and OBS2 are set (S353 and S354). The timing controller 130 may activate the compensation steps only when the rate of change ΔG of grayscale of the pixel data is greater than the reference value GREF on the basis of a result of comparing the rate of change ΔG of grayscale of the pixel data in units of frames or pixel lines with the reference value GREF. Accordingly, the compensation steps OBS, OBS1, and OBS2 may be set only for a frame period or a pixel line in which the rate of change ΔG of grayscale of the pixel data is high.

In the method of selectively driving pixels, when the rate of change ΔG of grayscale of the pixel data is less than or equal to the reference value GREF, the pixels are driven by output signals of the gate driver 120 for which the compensation steps OBS, OBS1, and OBS2 are not set (S355).

Figure 36:
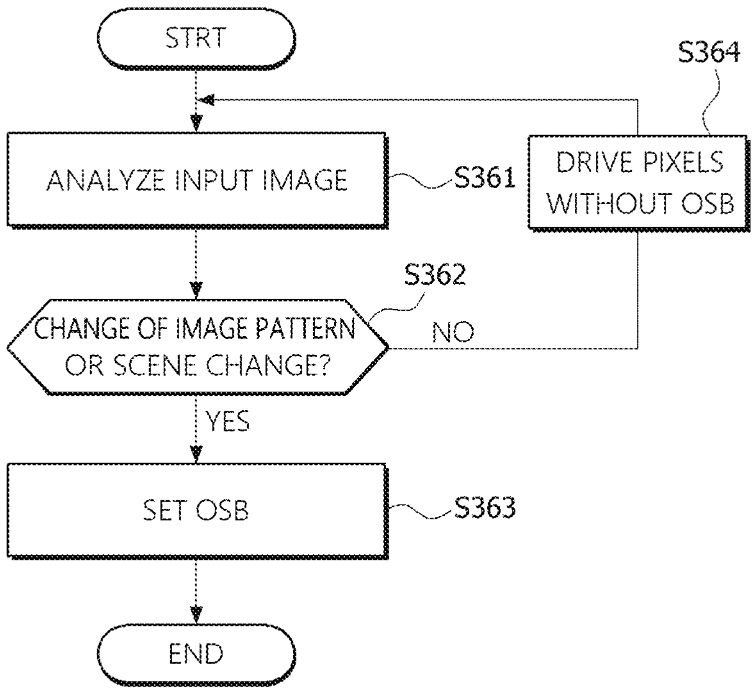
FIG. 36 is a flowchart of a method of selectively driving pixels according to the second embodiment of the present disclosure.

FIG. 36 is a flowchart of a method of selectively driving a pixel according to the second embodiment of the present disclosure.

Referring to FIG. 36, the method of selectively driving pixels, an input image is analyzed to determine whether an image pattern is changed or a scene change occurs (S361 and S362). Here, an example of a change of the image pattern includes a case in which a white image is displayed in a subsequent frame on a screen on which a black image is displayed in a previous frame or vice versa. As another example of a change in the image pattern, a color or pattern reproduced on the screen in a previous frame may be changed to a different color or pattern in a subsequent frame. The scene change may be understood to mean changing at least a part of an image displayed on the screen in a subsequent frame as found by analyzing images of frames. In the case of a still image, there is no scene change between frames. The timing controller 130 may identify a change of the image pattern or a scene change in an image on the basis of a rate of change of grayscale of pixel data between frames.

In the method of selectively driving pixels, when there is a change of the image pattern or a scene change, the pixels are driven by output signals of the gate driver 120 for which the compensation steps OBS, OBS1, and OBS2 are set (S363). The timing controller 130 may control the gate driver 120 by activating the compensation steps OBS, OBS1, and OBS2 only when there is a change of the image pattern or a scene change. Thus, the gate driver 120 may output the signals SCAN1, SCAN2, EM, and REF for which the compensation steps OBS, OBS1, and OBS2 are added only when there is a change of the image pattern or a scene change.

In the method of selectively driving pixels, when there is no change of the image pattern and no scene change, the pixels are driven by output signals of the gate driver 120 for which the compensation steps OBS, OBS1, and OBS2 are not set (S364).

Figure 37:
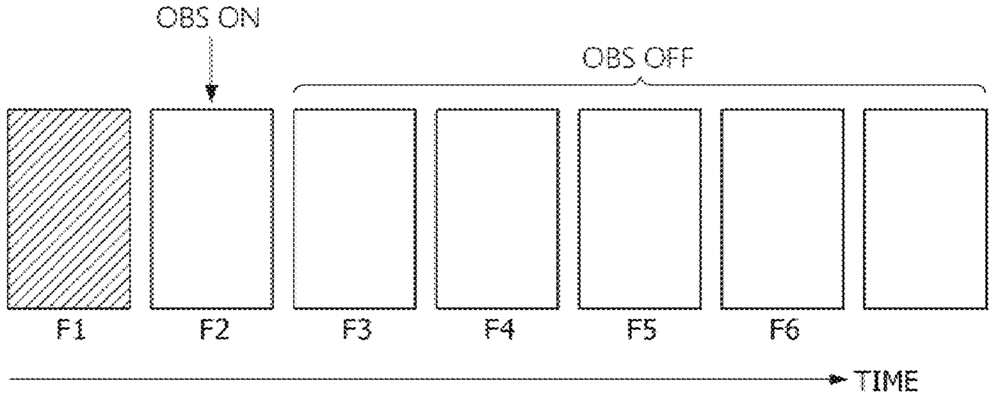
FIG. 37 is a diagram illustrating an example of setting compensation steps only when there is a change of a pattern or scene between frames.

FIG. 37 is a diagram showing an example of setting the compensation steps OBS, OBS1, and OBS2 only when there is a change of an image pattern or a scene change between frames. As shown in FIG. 37, in the method of selectively driving pixels, pixels may be driven by output signals of the gate driver 120 for which the compensation steps OBS, OBS1, and OBS2 are set only in a frame in which a change of the image pattern or a scene change occurs, e.g., a second frame F2. In FIG. 37, "OBS ON" denotes a frame for which the compensation steps OBS, OBS1, and OBS2 are set, and "OBS OFF" denotes a frame for which the compensation steps OBS, OBS1, and OBS2 are not set.

Figure 38:
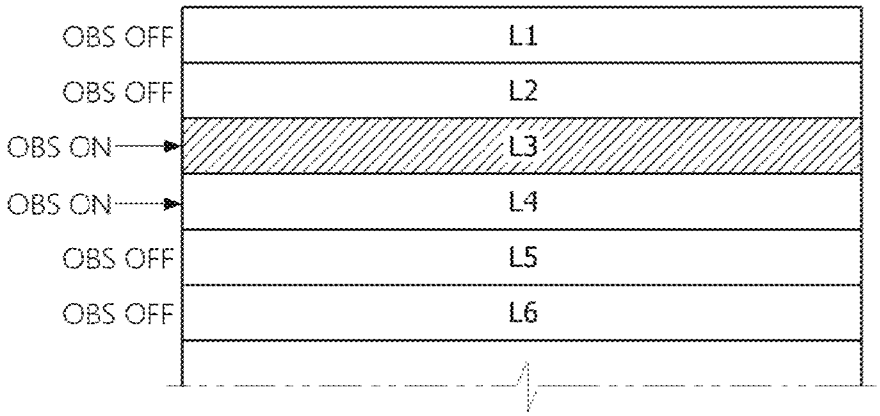
FIG. 38 is a diagram illustrating an example of setting compensation steps only when a rate of change of grayscale between pixel lines is large or when there is a pattern change.

FIG. 38 is a diagram illustrating an example of setting compensation steps only when a rate of change of grayscale between pixel lines is large or when there is a pattern change. As shown in FIG. 38, in a method of selectively driving pixels, pixels may be driven by output signals of the gate driver 120 for which the compensation steps OBS, OBS1, and OBS2 are set only at a pixel line at which a rate of change ΔG of grayscale is large or a change of an image pattern occurs, e.g., third and fourth pixel lines L3 and L4. In FIG. 38, "OBS ON" denotes a pixel line for which the compensation steps OBS, OBS1, and OBS2 are set, and "OBS OFF" denotes a pixel line for which the compensation steps OBS, OBS1, and OBS2 are not set.

Figure 39:
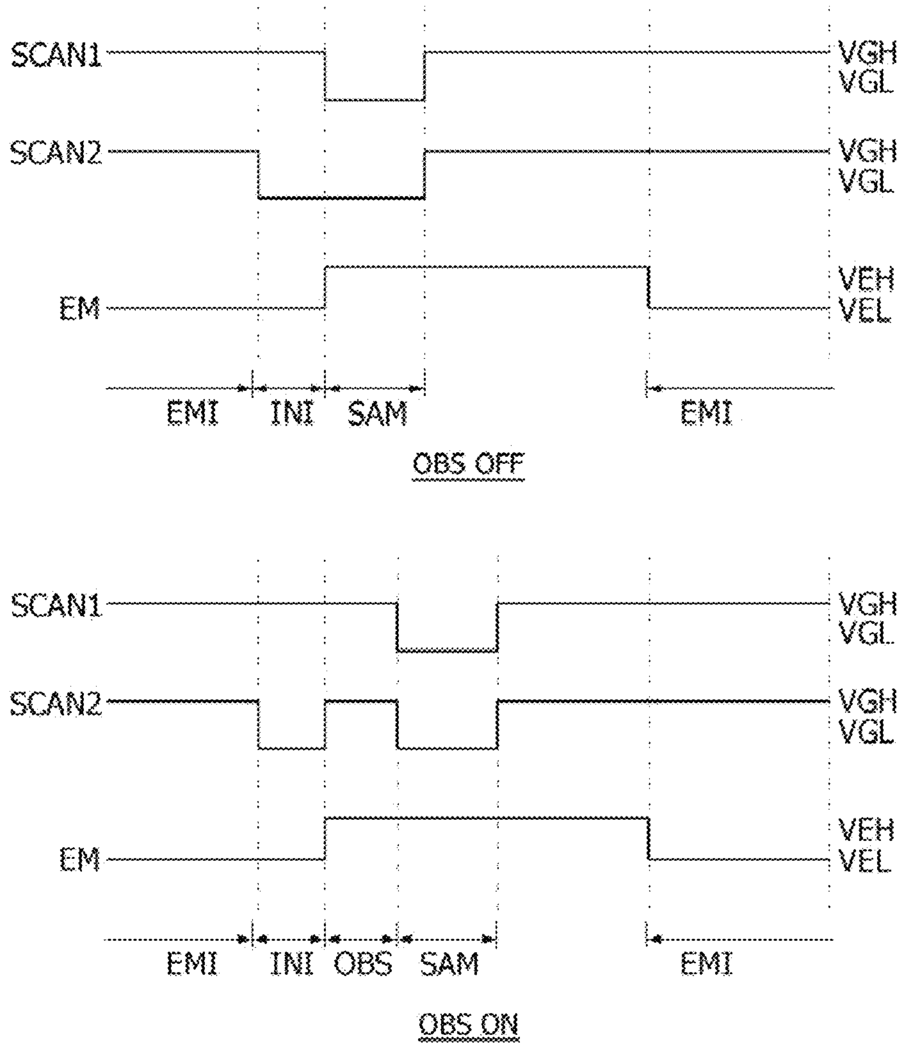
FIG. 39 is a diagram illustrating examples of an output signal of a gate driver for which a compensation step is set and an output signal of the gate driver for which the compensation step is not set.

FIG. 39 is a diagram illustrating examples of an output signal of the gate driver 120 for which a compensation step is set and an output signal of the gate driver 120 for which the compensation step is not set. In the case of gate signals for which compensation steps OBS, OBS1, and OBS2 are not set, an initialization step INI and a sampling step SAM are sequentially set without the compensation step OSB, OSB1 and OSB2 and an step EMI of driving a light-emitting element is set after the sampling step SAM.

According to the present disclosure, a compensation step of lowering a threshold voltage by increasing a gate-source voltage before sampling a threshold voltage of a driving element disposed on each pixel is added to drive the driving element without being affected by a previously charged voltage. Accordingly, according to the present disclosure, first frame response (FFR) characteristics can be improved.

According to the present disclosure, FFR characteristics can be further improved by adding compensation steps before an step of driving a light-emitting element.

According to the present disclosure, a reference voltage to be applied to pixels may be lowered during initialization of the pixels to further improve FFR characteristics without causing a change of luminance of black grayscale and reduce power consumption.

According to the present disclosure, FFR characteristics can be improved by setting a compensation step only when a rate of change of grayscale of pixel data is large or when a change of an image pattern or a scene change occurs.

Effects of the present disclosure are not limited thereto and other effects that are not described here will be clearly understood by those of ordinary skill in the art from the following claims.

The objects to be achieved by the present disclosure, the means for achieving the objects, and effects of the present disclosure described above do not specify essential features of the claims, and thus, the scope of the claims is not limited to the disclosure of the present disclosure.

It will be apparent to those skilled in the art that various modifications and variations can be made in the pixel circuit and the display device including the same of the present disclosure without departing from the technical idea or scope of the disclosure. Thus, it is intended that the present disclosure cover the modifications and variations of this disclosure provided they come within the scope of the appended claims and their equivalents.

What is claimed is:

1. A pixel circuit, comprising:
- a capacitor connected between a first node and a second node;
- a driving element comprising a gate electrode connected to the second node, a first electrode to which a pixel driving voltage is applied, and a second electrode connected to a third node;
- a light-emitting element comprising an anode electrode connected to a fourth node and a cathode electrode to which a low-potential power supply voltage is applied;
- a first switch element configured to be turned on by a gate-on voltage of a first scan pulse to apply a data voltage to the first node;
- a second switch element configured to be turned on by a gate-on voltage of a second scan pulse to connect the second node to the third node;
- a third switch element configured to be turned on by a gate-on voltage of a first light-emitting control pulse to apply a reference voltage to the first node, the reference voltage being lower than the pixel driving voltage and the low-potential power supply voltage;
- a fourth switch element configured to be turned on by the gate-on voltage of a second light-emitting control pulse to connect the third node to the fourth node; and
- a fifth switch element configured to be turned on by the gate-on voltage of the second scan pulse to apply the reference voltage to the fourth node, wherein:
- a driving period of the pixel circuit includes a first step, a second step, a third step, a fourth step, and a fifth step,
- the first scan pulse is generated to have the gate-on voltage in the third step and is generated to have a gate-off voltage in the first, second, fourth and fifth steps,
- the second scan pulse is generated to have the gate-on voltage in the first and third steps and is generated to have the gate-off voltage in the second, fourth and fifth steps, the first light-emitting control pulse is generated to have the gate-off voltage in the second and third steps and is generated to have the gate-on voltage in the first, fourth and fifth steps,
- the second light-emitting control pulse is generated to have the gate-off voltage in the second, third and fourth steps and is generated to have the gate-on voltage in the first and fifth steps, and
- the first, second, third, fourth and fifth switch elements are turned on by the gate-on voltage and turned off by the gate-off voltage.

2. The pixel circuit of claim 1, wherein:
- in the second step, a voltage of the third node is a voltage higher than or equal to the pixel driving voltage.

3. The pixel circuit of claim 1, wherein the reference voltage comprises:
- a first reference voltage to be applied to the third switch element; and
- a second reference voltage to be applied to the fifth switch element, the second reference voltage being set to be lower than the first reference voltage.

4. The pixel circuit of claim 3, wherein the first switch element comprises a gate electrode connected to a first gate line to which the first scan pulse is applied, a first electrode connected to a data line to which the data voltage is applied, and a second electrode connected to the first node,
- the second switch element comprises a gate electrode connected to a second gate line to which the second scan pulse is applied, a first electrode connected to the second node, and a second electrode connected to the third node,
- the third switch element comprises a gate electrode connected to a third gate line to which the first light-emitting control pulse is applied, a first electrode connected to the first node, and a second electrode connected to a first power line to which the first reference voltage is applied,
- the fourth switch element comprises a gate electrode connected to a fourth gate line to which the second light-emitting control pulse is applied, a first electrode connected to the third node, and a second electrode connected to the fourth node, and
- the fifth switch element comprises a gate electrode connected to the second gate line, a first electrode connected to a second power line to which the second reference voltage is applied, and a second electrode connected to the fourth node.

5. The pixel circuit of claim 1, wherein the first switch element comprises a gate electrode connected to a first gate line to which the first scan pulse is applied, a first electrode connected to a data line to which the data voltage is applied, and a second electrode connected to the first node,
- the second switch element comprises a gate electrode connected to a second gate line to which the second scan pulse is applied, a first electrode connected to the second node, and a second electrode connected to the third node,
- the third switch element comprises a gate electrode connected to a third gate line to which the first light-emitting control pulse is applied, a first electrode connected to the first node, and a second electrode connected to a power line to which the reference voltage is applied,
- the fourth switch element comprises a gate electrode connected to a fourth gate line to which the second light-emitting control pulse is applied, a first electrode connected to the third node, and a second electrode connected to the fourth node, and
- the fifth switch element comprises a gate electrode connected to the second gate line, a first electrode connected to the power line, and a second electrode connected to the fourth node.

6. The pixel circuit of claim 1, wherein the reference voltage set in the first step is lower than the reference voltage set in the second to fourth steps.

7. A display device, comprising:
- a display panel in which a plurality of data lines, a plurality of gate lines, a plurality of power lines, and a plurality of pixels are disposed;
- a data driver configured to apply a data voltage to the plurality of data lines; and
- a gate driver configured to supply a gate signal to the plurality of gate lines, wherein:
- the gate signal comprises a first scan pulse, a second scan pulse, a first light-emitting control pulse, and a second light-emitting control pulse,
- each of the plurality of pixels comprises:
- a capacitor connected between a first node and a second node;

a driving element including a gate electrode connected to the second node, a first electrode to which a pixel driving voltage is applied, and a second electrode connected to a third node;

a light-emitting element comprising an anode electrode connected to a fourth node and a cathode electrode to which a low-potential power supply voltage is applied;

a first switch element configured to be turned on by a gate-on voltage of the first scan pulse to apply a data voltage to the first node;

a second switch element configured to be turned on by a gate-on voltage of the second scan pulse to connect the second node to the third node;

a third switch element configured to be turned on by a gate-on voltage of the first light-emitting control pulse to apply a reference voltage to the first node, the reference voltage being lower than the pixel driving voltage and the low-potential power supply voltage;

a fourth switch element configured to be turned on by a gate-on voltage of the second light-emitting control pulse to connect the third node to the fourth node; and a fifth switch element configured to be turned on by the gate-on voltage of the second scan pulse to apply the reference voltage to the fourth node, a voltage higher than or equal to the pixel driving voltage is applied to the third node in a state in which the second node is electrically separated from the third node by the second switch element in an off state, a driving period of the pixel circuit includes a first step, a second step, a third step, a fourth step, and a fifth step, the first scan pulse is generated to have the gate-on voltage in the third step and is generated to have a gate-off voltage in the first, second, fourth and fifth steps, the second scan pulse is generated to have the gate-on voltage in the first and third steps and is generated to have the gate-off voltage in the second, fourth and fifth steps, the first light-emitting control pulse is generated to have the gate-off voltage in the second and third steps and is generated to have the gate-on voltage in the first, fourth and fifth steps, the second light-emitting control pulse is generated to have the gate-off voltage in the second, third and fourth steps and is generated to have the gate-on voltage in the first and fifth steps, the first, second, third, fourth and fifth switch elements are turned on by the gate-on voltage and turned off by the gate-off voltage, and in the second and fourth steps, a voltage of the third node is the pixel driving voltage.

8. The display device of claim 7, wherein the reference voltage comprises:

a first reference voltage to be applied to the third switch element; and a second reference voltage to be applied to the fifth switch element, the second reference voltage being set to be lower than the first reference voltage.

9. The display device of claim 7, wherein the reference voltage set in the first step is lower than the reference voltage set in the second to fourth steps.

10. The display device of claim 7, further comprising a timing controller configured to supply pixel data to the data driver and control step timings of the data driver and the gate driver, wherein the timing controller outputs a control signal having an enable logic value only when a rate of change of grayscale of the pixel data is large or when a change of an image pattern or a scene change occurs, the gate driver outputs a gate signal for which a compensation step is added, in response to the control signal, and a voltage higher than or equal to the pixel driving voltage is applied to the third node in response to the enable logic value of the compensation step.

* * * * *